(12) United States Patent
Song et al.

(10) Patent No.: US 11,971,468 B2
(45) Date of Patent: Apr. 30, 2024

(54) METHOD FOR DETECTING TARGET OBJECT AND CORRESPONDING DETECTION APPARATUS

(71) Applicant: Huawei Technologies Co., Ltd., Shenzhen (CN)

(72) Inventors: Sida Song, Beijing (CN); Sha Ma, Beijing (CN); Lutao Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 17/390,286

(22) Filed: Jul. 30, 2021

(65) Prior Publication Data

US 2021/0356580 A1 Nov. 18, 2021

Related U.S. Application Data

(63) Continuation of application No. PCT/CN2020/071806, filed on Jan. 13, 2020.

(30) Foreign Application Priority Data

Feb. 1, 2019 (CN) .......................... 201910105859.1

(51) Int. Cl.
  *G01S 13/38* (2006.01)
  *G01S 7/02* (2006.01)
(52) U.S. Cl.
  CPC ............ *G01S 13/38* (2013.01); *G01S 7/0232* (2021.05)
(58) Field of Classification Search
  CPC .................................. G01S 13/38; G01S 7/0232
  See application file for complete search history.

(56) References Cited

U.S. PATENT DOCUMENTS

| 10,121,813 | B2 | 11/2018 | Eichenholz et al. |
| 2007/0200747 | A1 | 8/2007 | Okai et al. |
| 2008/0284638 | A1 | 11/2008 | Kajio et al. |
| 2009/0278727 | A1* | 11/2009 | Inaba .................... G01S 7/0235 342/112 |
| 2016/0154091 | A1* | 6/2016 | Yosoku ................. G01S 7/0232 342/201 |

(Continued)

FOREIGN PATENT DOCUMENTS

| CN | 101089653 A | 12/2007 |
| CN | 101248367 A | 8/2008 |

(Continued)

OTHER PUBLICATIONS

Yang, X., et al., "Anti-interference Waveform Design for Automotive Radar," 2017, 4 pages.

(Continued)

*Primary Examiner* — Marcus E Windrich
(74) *Attorney, Agent, or Firm* — Conley Rose, P.C.

(57) ABSTRACT

A method for detecting a target object implemented by a detection apparatus, where the detection apparatus transmits a radio signal on a frequency band on which mutual interference can be avoided to avoid or reduce interference caused by a transmit signal or a related signal of any detection apparatus when another detection apparatus determines a target. The detection apparatus divides a frequency band or a frequency domain raster based on a determined threshold to allow partial overlapping between frequency bands or rasters.

20 Claims, 16 Drawing Sheets

(56) References Cited

U.S. PATENT DOCUMENTS

| | | | |
|---|---|---|---|
| 2018/0252797 A1 | 9/2018 | Frick et al. | |
| 2018/0356495 A1 | 12/2018 | Moss et al. | |
| 2019/0377077 A1* | 12/2019 | Kitayama | G01S 7/0232 |
| 2021/0055413 A1* | 2/2021 | Engewald | H04B 1/0483 |

FOREIGN PATENT DOCUMENTS

| | | |
|---|---|---|
| CN | 102141606 A | 8/2011 |
| CN | 102707266 A | 10/2012 |
| CN | 103983953 A | 8/2014 |
| CN | 104122273 A | 10/2014 |
| CN | 105137422 A | 12/2015 |
| CN | 108549086 A | 9/2018 |
| CN | 108919241 A | 11/2018 |
| CN | 109001692 A | 12/2018 |
| DE | 102015224787 A1 | 6/2017 |
| DE | 102017100780 A1 | 7/2018 |
| EP | 3605134 A1 | 2/2020 |
| EP | 3845923 A1 | 7/2021 |
| JP | 2016102745 A | 6/2016 |
| WO | 2018180584 A1 | 10/2018 |

OTHER PUBLICATIONS

Li Si, "Theoretical and Experimental Research on the Widely-Spaced Phased-MIMO Sonar Detection",Zhejiang University,Mar. 2014,with an English abstract,total 127 pages.

* cited by examiner

METHOD FOR DETECTING TARGET OBJECT AND CORRESPONDING DETECTION APPARATUS

CROSS-REFERENCE TO RELATED APPLICATIONS

This application is a continuation of International Patent Application No. PCT/CN2020/071806 filed on Jan. 13, 2020, which claims priority to Chinese Patent Application No. 201910105859.1 filed on Feb. 1, 2019. The disclosures of the aforementioned applications are hereby incorporated by reference in their entireties.

TECHNICAL FIELD

Embodiments of this application relate to the wireless communications field for self-driving/intelligent driving, and in particular, to a method for detecting a target object by using a radio signal and a corresponding detection apparatus.

BACKGROUND

With the development of society, increasingly more machines in the modern life develop towards automation and intelligentization, and a vehicle used for mobile traveling is no exception. An intelligent vehicle is entering the daily life of people. In recent years, an advanced driver-assistance systems (ADAS) plays a very important role in the intelligent vehicle. In the system, various sensors installed on the vehicle are used to sense an ambient environment, collect data, and identify, detect, and trace a still object and a moving object in a driving process of the vehicle, and perform a system operation and system analysis with reference to map data of a navigator, so that a driver detects a possible danger in advance, to effectively increase driving comfort and safety of the vehicle.

In an unmanned driving architecture, a sensor layer includes a vision-type sensor such as a vehicle-mounted camera and a radar-type sensor such as a vehicle-mounted millimeter-wave radar, a vehicle-mounted laser radar, and a vehicle-mounted ultrasonic radar. The millimeter-wave radar has become a main sensor of an unmanned driving system due to low costs and a mature technology. More than 10 functions have been developed for the ADAS. Adaptive cruise control (ACC), autonomous emergency braking (AEB), lane change assist (LCA), and blind spot monitoring (BSD) cannot be separated from the vehicle-mounted millimeter-wave radar. A millimeter wave is an electromagnetic wave with a wavelength of 1 millimeter (mm) to 10 mm, and a corresponding frequency range is 30 gigahertz (GHz) to 300 GHz. On the frequency band, millimeter wave-related features are very suitable for use in the vehicle-mounted field. For example, a high bandwidth, rich frequency domain resources, and a low antenna side lobe help implement imaging or quasi-imaging. A wavelength is short, so that a volume of a radar device and an antenna diameter are reduced, and a weight is reduced. A beam is narrow, so that a millimeter-wave beam is much narrower than a microwave beam in case of a same antenna size, and a radar resolution is high. Penetration is strong, so that there is a stronger capability of penetrating smoke, dust and fog than a laser radar and an optical system, thereby implementing full-day working.

With widespread use of vehicle-mounted radars, mutual interference between vehicles in which the vehicle-mounted radars are located is severer. Mutual interference reduces a detection probability of the vehicle-mounted radar or improves a probability of a false alarm (ghost), and an impact on driving safety or comfort of the vehicle cannot be ignored. On a basis of this, how to reduce interference between the vehicle-mounted radars is a technical problem that needs to be resolved urgently.

SUMMARY

Embodiments of this application provide a detection method, a detection apparatus, and a system, to reduce interference between detection apparatuses.

To achieve the foregoing objective, the following technical solutions are used in the embodiments of this application.

According to a first aspect, a method for detecting a target object by using a radio signal is provided. The method is applied to a first detection apparatus, and the method includes determining a first frequency band, where the first frequency band is one of N frequency bands, and transmitting the radio signal on the first frequency band, where any frequency band in the N frequency bands partially overlaps at least one frequency band in the other N−1 frequency bands.

In the method provided in this application, a self-driving or advanced driving assistance system ADAS capability of a vehicle is improved. The method can be applied to the internet of vehicles, for example, vehicle-to-everything (V2X), Long-Term Evolution (LTE)-vehicle (LTE-V), and vehicle-to-vehicle (V2V).

Further, the N frequency bands may be preset or predefined. For example, the N frequency bands are set or defined by setting or defining frequency domain intervals, bandwidths, and the like of the N frequency bands. The frequency domain interval may be indicated by using a frequency domain interval of at least one of lowest frequency domain locations, highest frequency domain locations, and center frequency domain locations of at least two frequency bands in the N frequency bands. A specific limitation is not imposed, provided that a frequency domain interval between the at least two frequency bands in the N frequency bands can be determined.

In the foregoing technical solution provided in the first aspect, each detection apparatus transmits a radio signal on a determined frequency band on which mutual interference can be avoided, to avoid interference caused by a transmit signal or a related signal of any detection apparatus when another detection apparatus determines a target object. Partial overlapping between frequency bands can avoid a waste of frequency domain resources that is caused because sweeping frequency bands of a plurality of detection apparatuses are totally separated in a frequency domain, so that frequency resources can be effectively used, higher anti-interference performance is implemented by using fewer frequency resources, and communication between a larger quantity of radars can be supported.

In a possible implementation, an absolute value of a difference between lowest frequencies of any two frequency bands in the N frequency bands is not less than a first threshold F, and N is a positive integer. A transmit frequency band is determined based on the first threshold F, so that a plurality of detection apparatuses can transmit radio signals on determined frequency bands without interfering with each other, and interference caused by a transmit signal or a related signal of any detection apparatus when another detection apparatus determines a target object can be avoided, thereby implementing accurate detection of each target object.

In a possible implementation, an absolute value of a difference between a lowest frequency of any frequency band other than the first frequency band in the N frequency bands and a lowest frequency of the first frequency band is a positive integer multiple of the first threshold F. In this manner, a plurality of detection apparatuses can transmit radio signals on determined frequency bands without interfering with each other, and interference caused by a transmit signal or a related signal of any detection apparatus when another detection apparatus determines a target object can be avoided, thereby implementing accurate detection of each target object.

In a possible implementation, the N frequency bands may include a second frequency band and a third frequency band, an absolute value of a difference between lowest frequencies of the second frequency band and the third frequency band is not less than a first threshold F, and a bandwidth of the second frequency band is different from a bandwidth of the third frequency band. Frequency band division is performed based on the first threshold F, so that each detection apparatus transmits a radio signal on a determined frequency band, to avoid interference caused by a transmit signal or a related signal of any detection apparatus when another detection apparatus determines a target object.

In a possible implementation, the second frequency band is a frequency band in a second frequency band subset, the third frequency band is a frequency band in a third frequency band subset, a bandwidth of any frequency band in the second frequency band subset is a second bandwidth, a bandwidth of any frequency band in the third frequency band subset is a third bandwidth, the second bandwidth is different from the third bandwidth, and the second frequency band subset and the third frequency band subset are subsets of the N frequency bands. In this manner, when there is a plurality of different types of radars, frequency band setting can be more comprehensive and more compatible, and target object detection without mutual interference is still supported.

In a possible implementation, a value of the first threshold F is determined based on at least one of the following when a second detection apparatus is an interfering source, a maximum interference tolerance distance of the first detection apparatus, a sweeping bandwidth of a radio signal of the first detection apparatus, a maximum ranging distance of the first detection apparatus, and a transmit cycle of the radio signal of the first detection apparatus, or when the first detection apparatus is an interfering source, a maximum interference tolerance distance of a second detection apparatus, a sweeping bandwidth of a radio signal of the second detection apparatus, a maximum ranging distance of the second detection apparatus, and a transmit cycle of the radio signal of the second detection apparatus. The first threshold F is determined based on attributes of the transmit signals of the first detection apparatus and the second detection apparatus, so that a transmit frequency band can be determined based on the first threshold F, to avoid interference caused by a transmit signal or a related signal of any detection apparatus when another detection apparatus determines a target object.

In a possible implementation, the value of the first threshold F meets the following formula: $F=\max(|\Delta f_1|, |\Delta f_2|, |\Delta f_3|, |\Delta f_4|)+\sigma$, where $$\Delta f_1 = B_i - B_j + \frac{B_j\left(\frac{dif_{max}^{ji}}{c} + \Delta\tau\right)}{T_{cj}},$$

$$\Delta f_2 = \frac{B_j}{T_{cj}}\left(\frac{2d_{max}^i}{c} - \frac{dif_{max}^{ji}}{c} - \Delta\tau\right), \Delta f_3 = \frac{B_j}{T_{cj}}\left(\frac{dif_{max}^{ij}}{c} + \Delta\tau\right),$$

$$\text{and } \Delta f_4 = \frac{B_i}{T_{ci}}\left(T_{ci} - \frac{dif_{max}^{ij}}{c} - \Delta\tau\right) - \frac{B_j}{T_{cj}}\left(T_{cj} - \frac{2d_{max}^j}{c}\right),$$

where $B_i$ is the sweeping bandwidth of the radio signal of the first detection apparatus, $B_j$ is the sweeping bandwidth of the radio signal of the second detection apparatus, $B_i > B_j$, $dif_{max}^{ji}$ is the maximum interference tolerance distance of the first detection apparatus when the second detection apparatus is an interfering source, $\Delta\tau$ is a transmission timing error, $d_{max}^i$ is the maximum ranging distance of the first detection apparatus, $dif_{max}^{ij}$ is the maximum interference tolerance distance of the second detection apparatus when the first detection apparatus is an interfering source, $d_{max}^j$ is the maximum ranging distance of the second detection apparatus, c is the speed of light, $T_{ci}$ is the transmit cycle of the radio signal of the first detection apparatus, $T_{cj}$ is the transmit cycle of the radio signal of the second detection apparatus, and σ is a predetermined constant or a preconfigured constant. The first threshold F is determined by using the foregoing calculation method based on the attributes of the transmit signals of the first detection apparatus and the second detection apparatus, so that the transmit frequency band can be determined based on the first threshold F, to avoid interference caused by a transmit signal or a related signal of any detection apparatus when another detection apparatus determines a target object.

In a possible implementation, the first frequency band is a frequency band in a first frequency band subset, and the first frequency band subset is a subset of the N frequency bands, an absolute value of a difference between lowest frequencies of any two frequency bands in the first frequency band subset is a positive integer multiple of a second threshold F', and the first frequency band subset corresponds to the first detection apparatus, and the first frequency band subset is one of the second frequency band subset and the third frequency band subset. In this manner, sweeping frequency bands corresponding to same types of radars or different types of radars can be implemented. When a plurality of types of radars exist, frequency band setting is more comprehensive and more compatible.

In a possible implementation, the second threshold F' is greater than or equal to a frequency change range F1 of the radio signal within a first time length T1, and F' and F1 meet a formula F'=F1+σ, σ is a predetermined constant or a preconfigured constant, and σ≥0. An error factor is considered in a calculation result of the second threshold F', so that interference caused by some possible errors can be avoided.

In a possible implementation, a value of the first time length T1 meets one of the following: $T1=2*d_{max}^i/c$, $T1=M*2*d_{max}^i/c$, $T1=2*d_{max}^i/c+dif_{max}^i/c$, $T1=\max(2*d_{max}^i/c, dif_{max}^i/c)$, $T1=2*d_{max}^i/c+\Delta\tau$, $T1=M*2*d_{max}^i/c+\Delta\tau$, $T1=2*d_{max}^i/c+\Delta\tau+dif_{max}^i/c$, and $T1=\max(2*d_{max}^i/c, dif_{max}^i/c)+\Delta\tau$, where $d_{max}^i$ is the maximum detection distance of the first detection apparatus, $\Delta\tau$ is the transmission timing error, $dif_{max}^i$ is the maximum interference tolerance distance of the first detection apparatus, c is the speed of light, and M is an integer greater than or equal to 2. T1 is determined based on a capability of a detection apparatus, for example, whether the detection apparatus can distinguish between a positive intermediate frequency and a negative intermediate frequency, or a delay caused by a maximum detection distance, or based on another delay that may cause relatively large interference, for example, a maximum tolerance distance of interference or a transmission timing error. Further, F' may be determined based on T1. The maximum interference tolerance distance herein is a maximum interference tolerance distance of the first detection apparatus when another first detection apparatus having a same attribute or parameter as the first detection apparatus is used as an interfering source. Because another detection apparatus that has a different attribute or parameter does not need to be considered, for ease of description, the maximum interference tolerance distance herein is directly referred to as the maximum interference tolerance distance of the first detection apparatus. Further, the foregoing attribute or parameter may include at least one of the following: a transmit power of a radio signal of a detection apparatus (a detection apparatus used as an interfering source) and sensitivity of a receiver of a detection apparatus (a current detection apparatus). In other words, when the maximum interference tolerance distance of the first detection apparatus is determined, a detection apparatus having a same attribute or parameter is considered, and the detection apparatus used as an interfering source has a same attribute or parameter as the current detection apparatus. The foregoing attribute or parameter may also be at least one other parameter that is associated with or has a mapping relationship with the transmit power of the radio signal of the detection apparatus and/or the sensitivity of the receiver of the detection apparatus.

In a possible implementation, a bandwidth of the first frequency band is a sweeping bandwidth of the radio signal.

According to a second aspect, a detection apparatus is provided, where the detection apparatus has a function of implementing the method in any possible implementation of the first aspect. The function may be implemented by hardware, or may be implemented by hardware by executing corresponding software. The hardware or software includes one or more modules corresponding to the function.

According to a third aspect, a detector is provided, where the detector includes a processor and a transmit antenna, the processor is configured to determine a first frequency band, where the first frequency band is one of N frequency bands, and the transmit antenna is configured to transmit a radio signal on the first frequency band, where any frequency band in the N frequency bands partially overlaps at least one frequency band in the other N−1 frequency bands.

In the foregoing technical solution provided in the third aspect, each detection apparatus transmits a radio signal on a determined frequency band on which mutual interference can be avoided, to avoid interference caused by a transmit signal or a related signal of any detection apparatus when another detection apparatus determines a target object. Partial overlapping between frequency bands can avoid a waste of frequency domain resources that is caused because sweeping frequency bands of a plurality of detection apparatuses are totally separated in a frequency domain, so that frequency resources can be effectively used, higher anti-interference performance is implemented by using fewer frequency resources, and communication between a larger quantity of radars can be supported.

In a possible implementation, the detector further includes a receive antenna, configured to receive a reflected signal of the radio signal, where the reflected signal is a signal obtained by reflecting the radio signal by a target object. Information about the target object is determined by receiving the radio signal and the reflection signal.

An embodiment of this application further provides a detection apparatus, including at least one processor, at least one memory, and a communications interface, where the communications interface and the at least one memory are coupled to the at least one processor, a terminal communicates with another device by using the communications interface, and the at least one memory is configured to store a computer program, so that when the computer program is executed by the at least one processor, the method for detecting a target object by using a radio signal according to the first aspect and the possible implementations of the first aspect is implemented.

An embodiment of this application further provides a computer readable storage medium, such as a non-transitory computer readable storage medium. A computer program is stored on the computer readable storage medium, and when the computer program is run on a computer, the computer is enabled to perform any possible method in the first aspect. For example, the computer may be at least one storage node.

An embodiment of this application further provides a computer program product. When the computer program product is run on a computer, any method provided in the first aspect is performed. For example, the computer may be at least one storage node.

An embodiment of this application further provides a chip, configured to support a detection apparatus in implementing a function in any possible method in the first aspect, such as generating or processing data and/or information in the method. In a possible design, the chip further includes a memory, and the memory is configured to store a program instruction and data that are required by the detection apparatus.

An embodiment of this application further provides a chip, where the chip includes a processing module and a communications interface, the processing module is configured to control the communications interface to communicate externally, and the processing module is further configured to implement any possible method in the first aspect.

It may be understood that any terminal, computer storage medium, computer program product, or chip provided above is configured to perform a corresponding method provided in the foregoing descriptions. Therefore, for a beneficial effect that can be achieved by any apparatus, computer storage medium, computer program product, or chip, refer to a beneficial effect in a corresponding method. Details are not described herein again.

DESCRIPTION OF EMBODIMENTS

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

Figure 1:
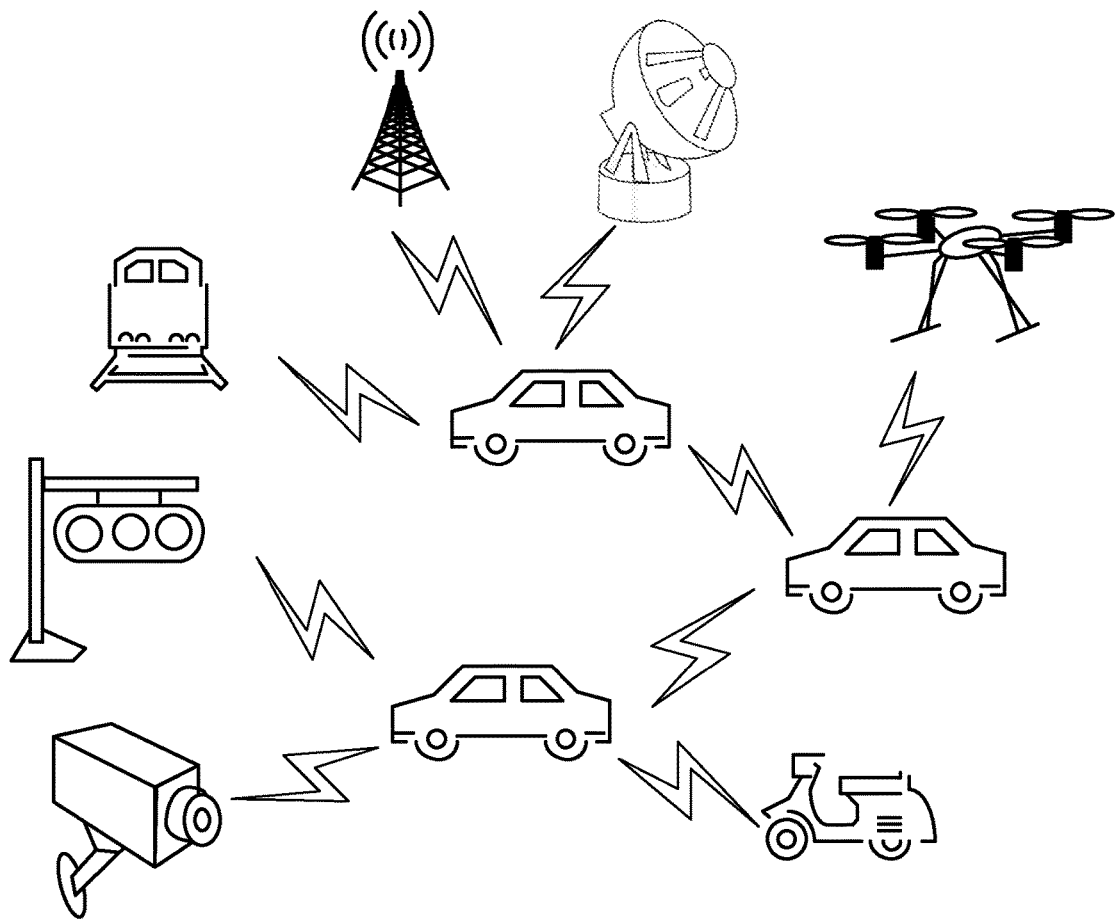
FIG. 1 is a schematic diagram of a possible application scenario according to an embodiment of this application.

FIG. 1 is a schematic diagram of a possible application scenario according to an embodiment of this application. A radar may be installed on a motor vehicle, an unmanned aerial vehicle, a rail motor vehicle, a bicycle, a traffic light, a speed measurement apparatus, a network device (such as a base station or a terminal device in various systems), or the like. This application is applicable to not only a radar system between vehicles, but also a radar system between a vehicle and another apparatus such as an unmanned aerial vehicle, or a radar system between other apparatus. An installation location and a function of the radar are not limited in this application.

The following explains terms that may appear in the embodiments of this application.

A radar is also referred to as a radar apparatus, or may be referred to as a detector, a detection apparatus, or a radio signal sending apparatus. A working principle of the radar is to detect a corresponding target object by transmitting a signal (or a detection signal) and receiving a reflected signal obtained by reflecting the signal by the target object.

For an initial frequency, the radar transmits a radar signal at the initial frequency at the beginning of a transmit cycle, and a transmit frequency varies in the transmit cycle based on the initial frequency.

An available bandwidth is a frequency domain range in which the radar signal is allowed to transmit a signal, and generally needs to comply with laws and regulations.

A sweeping bandwidth is a bandwidth occupied by a radar signal waveform. It should be noted herein that the "sweeping bandwidth" is defined for ease of description, and is technically the bandwidth occupied by the radar signal waveform. Further, a frequency band occupied by the radar signal waveform may be referred to as a sweeping frequency band. A transmit cycle of a radar signal is also referred to as a sweeping time period, namely, a time period of transmitting a complete waveform.

A frequency-modulated continuous-wave (FMCW) is an electromagnetic wave whose frequency changes with time.

A linear FMCW (LFMCW) is an electromagnetic wave whose frequency changes with time linearly. A linear change herein generally means a linear change in a transmit cycle. Further, a waveform of the LFMCW is generally a sawtooth wave or a triangular wave, or another possible waveform may exist, such as a pulse.

A noise power is a noise power of a radar receiver. For a specific meaning, refer to the conventional technology. "Causing interference" mentioned in the embodiments of this application generally means that a power of an interference signal is greater than or equal to the noise power.

A maximum ranging distance is also referred to as a maximum detection distance, and is a parameter (a factory setting parameter or related to a factory setting parameter) related to configuration of the radar. For example, a maximum ranging distance of a long-range ACC radar is 250 meters (m), and a maximum ranging distance of a mid-range radar is 70 m to 100 m. If the maximum ranging distance is 250 m, a specific application scenario does not require a high distance resolution of the radar. Optionally, the distance resolution is related to the sweeping bandwidth.

A maximum tolerance distance of interference is also referred to as a maximum interference tolerance distance. A signal sent by a radar at the maximum tolerance distance of interference to a current radar may cause interference to the current radar. The maximum tolerance distance of interference or the maximum interference tolerance distance may be explained from two perspectives. First, another type of radar is used as an interfering source. The maximum interference tolerance distance of the current radar is related to a type of the radar used as an interfering source, or is related to an attribute or a parameter of the radar used as an interfering source, for example, a transmit power. The radar used as an interfering source may also be referred to as an interfering radar. From the first perspective, the maximum interference tolerance distance of the current radar is a maximum interference tolerance distance existing when the interfering radar is used as an interfering source, that is, the maximum interference tolerance distance of the current radar is not a fixed value, but is related to the interfering radar used as an interfering source. Second, another type of a radar is not considered. For same types of radars, the maximum interference tolerance distance of the current radar is determined based on an attribute or a parameter of the current radar. Further, another radar signal is received by the current radar after a specific transmission delay. After the transmission delay, if a power of an interference signal is not less than sensitivity of a receiver, the interference signal causes interference to the current radar. If a power of an interference signal is less than sensitivity of a receiver, the interference signal does not cause interference to the current radar, and the interference signal is processed as a noise. In this case, After the transmission delay, if a power of an interference signal is equal to sensitivity of a receiver, a distance between a transmit-end radar of the interference signal and the current radar is referred to as the maximum tolerance distance of interference. The distance may also be understood as a distance corresponding to a space propagation delay required for receiving signals by a plurality of radars from each other. For the maximum tolerance distance of interference, it should be noted that there is another possibility. The maximum tolerance distance of interference may be a maximum distance for a lane to remain straight (a vehicle may travel in the lane in a straight line without changing a driving direction, and the straight line herein is not a straight line in a strict sense, but depends on a specific design of a road, for example, a lane in which the driving direction does not directly change to a left/right-turn or a U-turn, or a lane in front of which no obstacle exists, where the obstacle causes a change of a route direction). In a driving process of a vehicle, a person skilled in the art may learn that only when a radar signal of a previous vehicle is received by a radar receiver of a current vehicle, interference can be caused to a radar of the current vehicle. It is assumed that when a power of a transmit signal of another radar with a distance of 2000 m arrives at a current radar after a transmission delay, the power is equal to sensitivity of a receiver or is considered as a noise power. In this case, 2000 m may be referred to as the maximum interference tolerance distance. However, if a distance of a straight line of a road on which the radar is located is less than 2000 m, for example, a left/right-turn or another change occurs at a distance of 1000 m, a vehicle 1000 m away does not cause interference to the current radar (or there is no vehicle 1000 m away in a current straight driving direction). Therefore, a maximum value in the two distances may be used as the maximum tolerance distance of interference based on specific implementation, or one of the two distances may be defined as the maximum tolerance distance of interference based on a specific application or scenario. This depends on final implementation.

A signal transmission error is also referred to as a transmission timing error. When a plurality of radars need to transmit signals at the same time, a transmission timing error may exist when the signals are transmitted at the same time. It may be understood that a plurality of radars transmit a plurality of radar signals at the same time. However, due to a possible difference between actual communication scenarios, environments, or hardware devices, there is an error between actual transmit moments, and the error is referred to as the signal transmission error, for example, an error caused by a Global Positioning System (GPS) precision.

An intermediate frequency (IF) signal is a signal obtained after a mixer processes a local oscillator signal of a radar and a received target reflected signal. Further, a part of an FMCW signal generated by using an oscillator is used as a local oscillator signal, and a part of the FMCW signal is transmitted as a transmit signal by using a transmit antenna. A reflected signal that is of the transmit signal and that is received by using a receive antenna is mixed with the local oscillator signal to obtain the "intermediate frequency signal". At least one of location information, speed information, and angle information of a target object may be obtained by using the intermediate frequency signal. The location information, the speed information, and the angle information may be relative location information, relative speed information, and relative angle information relative to a current radar. Further, a frequency of the intermediate frequency signal is an intermediate frequency.

Figure 2:
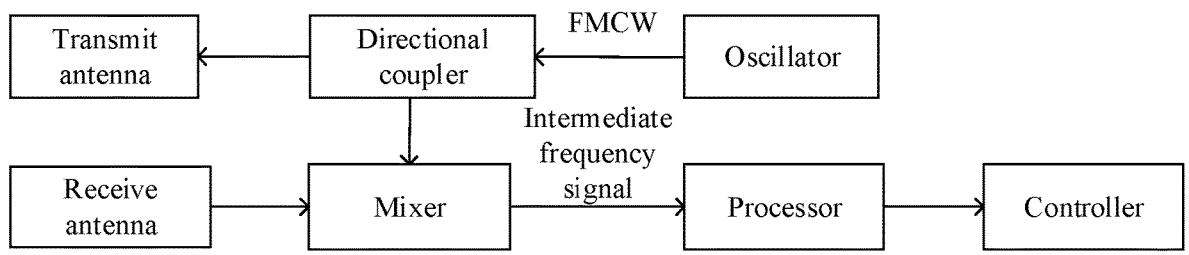
FIG. 2 is a schematic structural diagram of a vehicle-mounted millimeter-wave radar apparatus according to an embodiment of this application.

With reference to FIG. 2, the following describes a process of processing and transmitting a radar signal by using a reference architecture of a vehicle-mounted millimeter-wave radar apparatus. FIG. 2 is a schematic diagram of an example structure of a vehicle-mounted millimeter-wave radar apparatus that generally includes an oscillator, a transmit antenna, a receive antenna, a mixer, a processor, and another apparatus. A controller in FIG. 2 is generally not included in the vehicle-mounted millimeter-wave radar apparatus, but is included in a receive end of a signal that is output by the vehicle-mounted millimeter-wave radar apparatus, for example, may be located in a vehicle or a processing apparatus configured to control driving of the vehicle. This is not limited in this embodiment of this application. The oscillator generates an FMCW, for example, a signal whose frequency increases with time linearly. The signal may be referred to as an LFMCW). A part of the FMCW is output to the mixer as a local oscillator signal by using a directional coupler, and a part of the FMCW is transmitted by using the transmit antenna. A signal reflected by an object ahead of a vehicle is received by using the receive antenna, and is mixed with the local oscillator signal in the mixer to obtain an intermediate frequency signal. The intermediate frequency signal includes information about a target object, and the information about the target object may be a relative parameter between the target object and a vehicle in which the vehicle-mounted radar is located, for example, at least one type of information such as a relative distance, a relative speed, and a relative angle between the target object and the vehicle. The intermediate frequency signal (for example, the intermediate frequency signal may be an intermediate frequency signal obtained after processing by a low-pass filter and amplification processing, and the low-pass filter is not shown in FIG. 2) is sent to the processor. The processor processes (for example, the processor may perform fast Fourier transformation or spectrum analysis on the signal) the intermediate frequency signal to obtain the information about the target object, and finally outputs the information to the controller to control the vehicle. Generally, based on configuration of the radar, an intermediate frequency corresponding to a maximum ranging distance is considered as a maximum intermediate frequency, and a signal whose frequency is greater than the intermediate frequency is filtered out by the low-pass filter.

The following describes in detail a ranging principle of the millimeter-wave radar by using a sawtooth wave as an example. A ranging principle of a triangular wave is similar to that of the sawtooth wave.

Figure 3:
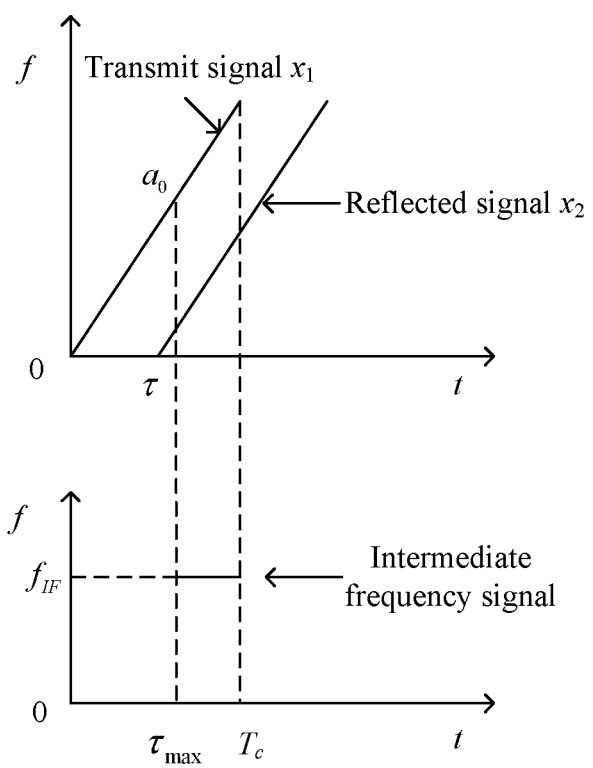
FIG. 3 is a schematic diagram of possible frequency changes of a transmit signal, a reflected signal, and an intermediate frequency signal according to an embodiment of this application.

The millimeter-wave radar transmits a series of signals by using the transmit antenna. The signal is reflected back after the signal meets an obstacle, and a transmit signal has a same shape as a reflected signal. FIG. 3 is a schematic diagram of possible frequency changes of a transmit signal, a reflected signal, and an intermediate frequency signal. As shown in FIG. 3, the transmit signal and the reflected signal are represented as follows:

$$x_1 = \sin(\omega_1(t) \cdot t + \varphi_1), \text{ and}$$

$$x_2 = \sin(\omega_2(t) \cdot t + \varphi_2),$$

where $\omega_1(t)$ and $\omega_2(t)$ are respectively angular velocities of the transmit signal $x_1$ and $x_2$, and $\varphi_1$ and $\varphi_2$ are respectively initial phases of the transmit signal $x_1$ and $x_2$. There is a delay $\tau$ between the transmit signal and the reflected signal. As shown in FIG. 3, a relationship between $\tau$ and a target distance d may be represented as follows:

$$\tau = \frac{2d}{c},$$

where c is the speed of light.

The transmit signal and the reflected signal are multiplied in the mixer, and are processed by the low-pass filter, so that an intermediate frequency (IF) signal is output. A frequency (intermediate frequency) of the intermediate frequency signal is equal to a frequency difference between the transmit signal and the reflected signal, and is represented as follows:

$$x_{out} = \sin[(\omega_1(t) - \omega_2(t)) \cdot t + (\omega_1 - \omega_2)].$$

As shown in FIG. 3, the intermediate frequency $f_{IF}$ is a product of a slope $a_0$ of the transmit signal and the delay $\tau$, that is, $$f_{IF} = a_0 * \tau = \frac{B}{T_c} * \frac{2d}{c} = \frac{2d}{c * T_c} * B.$$

Therefore, the distance d to a target object is as follows:

$$d = \frac{c * T_c}{2 * B} * f_{IF},$$

where $a_0$ is the slope of the transmit signal, $$a_0 = \frac{B}{T_c},$$

B is a sweeping bandwidth of the radar signal, $T_c$ is one transmit cycle for the sawtooth wave and $T_c$ is a half transmit cycle for the triangular wave, and it may be understood that $T_c$ is related to a waveform.

It can be learned from the foregoing derivation that there is a linear relationship between the delay and the frequency difference (namely, the intermediate frequency) between the transmit signal and the received reflected signal. If the object is farther, the reflected signal is received later, and the frequency difference between the reflected signal and the transmit signal is larger. A distance of the obstacle can be determined by determining the frequency of the intermediate frequency signal. In actual application, the distance to the target object may also be obtained by using a phase difference between the transmit signal and the reflected signal, that is, a distance between the object and the radar may be obtained by detecting the intermediate frequency or a phase. It may be learned from the foregoing descriptions that information about the target object is also included in intermediate frequency information or phase information. Due to setting of the low-pass filter, a signal whose frequency is greater than a maximum intermediate frequency can be filtered out, and therefore interference of the signal does not need to be considered. The maximum intermediate frequency is an intermediate frequency corresponding to a maximum ranging distance, or a frequency change range in a delay caused by a maximum ranging distance.

It should be noted that the slope of the transmit signal reflects a degree at which a transmit frequency or a receive frequency changes with time. If a frequency of the transmit signal decreases with time, the slope is a negative value. If a frequency of the transmit signal increases with time, the slope is a positive value. For the triangular wave, a rising edge slope and a falling edge slope are opposite numbers. An absolute value of the slope may also be referred to as a frequency change range per unit of time. Meanings of the two expressions in this embodiment of this application are the same.

Figure 4:
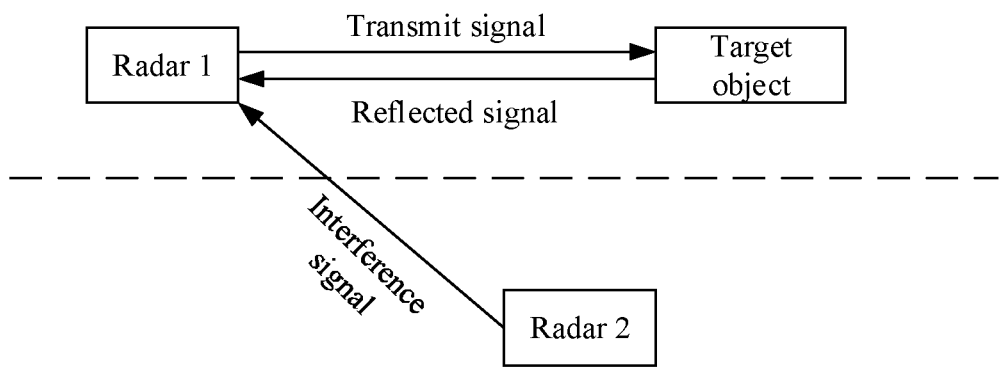
FIG. 4 is a schematic diagram in which vehicle-mounted radars interfere with each other according to an embodiment of this application.

FIG. 4 is a schematic diagram in which vehicle-mounted radars interfere with each other. As shown in FIG. 4, a radar 1 sends a transmit signal, and receives a reflected signal obtained by reflecting the transmit signal by a target object. When the radar 1 receives the target reflected signal, a receive antenna of the radar 1 receives a transmit signal of a radar 2 or a reflected signal of the transmit signal, namely, an interference signal. If the radar 1 detects the interference signal from the radar 2 within a time range between a moment of transmitting the signal and a moment of receiving the reflected signal, the radar 1 mistakenly considers that the interference signal ahead corresponds to a "target object". However, the "target object" actually does not exist, that is, a so-called "ghost" or "false alarm" is generated. When the false alarm is generated, a self-driving vehicle performs incorrect driving control due to misjudgment of the target object.

Figure 5A:
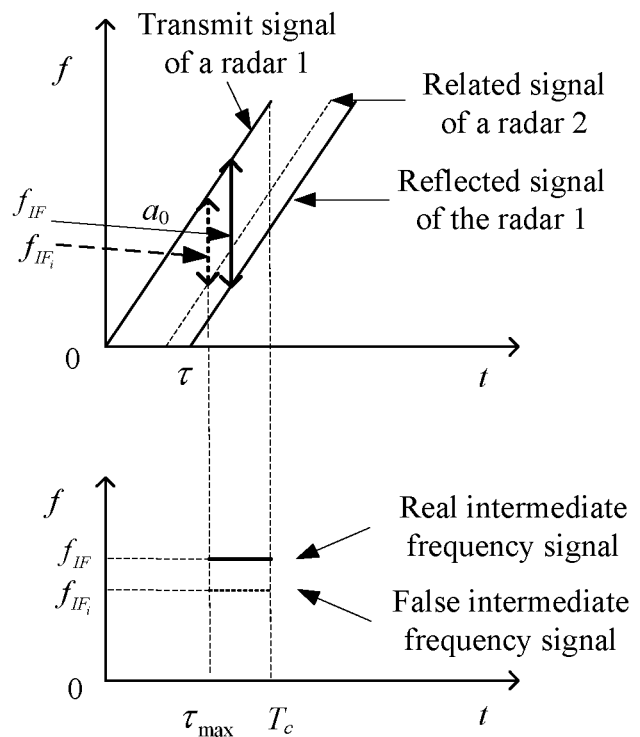
FIG. 5A and FIG. 5B are schematic diagrams of a possible false intermediate frequency signal according to an embodiment of this application.
Figure 5B:
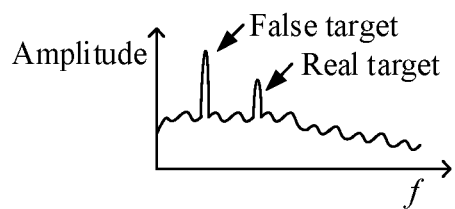

FIG. 5A and FIG. 5B are schematic diagrams of a possible false intermediate frequency signal. As shown in FIG. 5A, a radar 1 transmits a signal to a target object, and receives a reflected signal from the target object. However, within a time range between a moment of transmitting the signal by the radar 1 and a moment of receiving the reflected signal, a receive antenna of the radar 1 receives a transmit signal or a reflected signal (a dashed line) of a radar 2. A signal waveform of the radar 1 is consistent with a signal waveform of the radar 2, and sweeping bandwidths of the two signal waveforms are the same. Within a time interval in which the radar 1 transmits the signal but receives no reflected signal, if the radar 1 detects a dashed-line signal with a corresponding frequency, the radar 1 considers that a "target object 1" exists. The radar 1 starts to receive the reflected signal, and detects the dashed-line signal and a solid-line reflected signal within a time interval ($\tau$ max~T c) of signal detection. The radar 1 considers that both the "target object 1" and a "target object 2" exist. In this case, the radar 1 mistakenly considers the received dashed-line signal as a reflected signal from an object that exists ahead, and a false intermediate frequency signal is generated. After fast Fourier transformation, two peaks may be found through spectrum analysis. As shown in FIG. 5B, each peak corresponds to a target object. The radar 1 mistakenly considers that the "target object 1" exists ahead. However, the "target object 1" actually does not exist. This is also referred to as a "ghost" or a "false alarm".

Figure 6A:
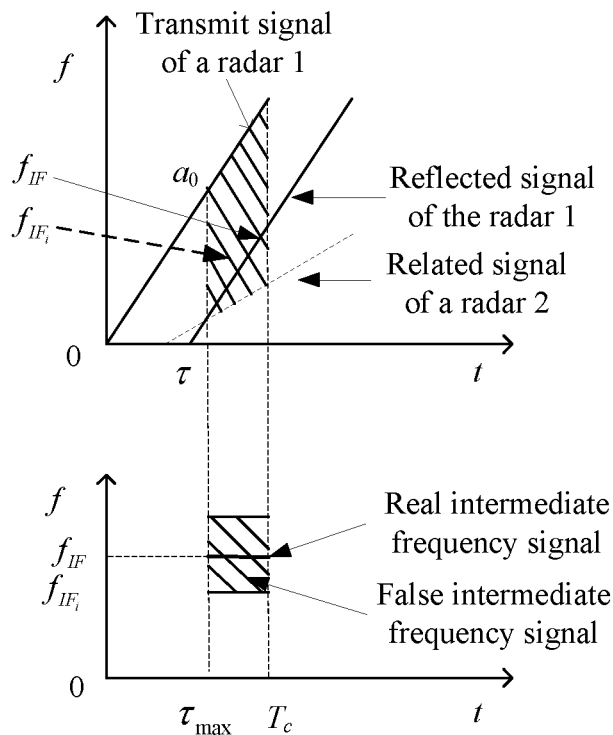
FIG. 6A and FIG. 6B are schematic diagrams of a result of drowning a target signal by an interference signal according to an embodiment of this application.
Figure 6B:
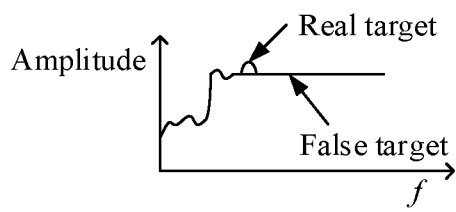

FIG. 6A and FIG. 6B are possible schematic diagrams of drowning a target signal by an interference signal. As shown in FIG. 6A, a radar 1 transmits a signal to a target object, and receives a reflected signal from the target object. However, within a time range between a moment of transmitting the signal by the radar 1 and a moment of receiving the reflected signal, a receive antenna of the radar 1 receives a transmit signal or a reflected signal (a dashed line) of a radar 2. A signal waveform of the radar 1 is different from a signal waveform of the radar 2 in terms of a slope. Within a time interval (τ max~T c) of signal detection, the radar 1 detects both a reflected signal of the radar 1 and a related signal of the radar 2. After the detected related signal of the radar 2 is mixed with the reflected signal of the radar 1, an intermediate frequency signal that includes various frequency components is generated. As shown in FIG. 6B, after fast Fourier transformation, an interference plateau appears, so that a "protrusion" degree of a real target is not enough. This brings a detection difficulty, and improves a possibility of missing detection. After missing detection occurs, when an object exists ahead of a self-driving vehicle, the self-driving vehicle mistakenly considers that no object exists, and does not decelerate or brake. Consequently, a traffic accident is caused, and driving safety of the vehicle is reduced.

It should be noted herein that a person skilled in the art may learn that a signal received at a moment or within a time period may be an interference signal, or may be a reflected signal of a target object. Detection of a radar can be clearly reflected by using time and a related frequency change of a transmit/reflected signal. Therefore, in subsequent descriptions of this application, mutual interference between radars is mostly represented by using a curve diagram reflecting a slope (a frequency change range per unit of time) of the transmit/reflected signal.

Figure 7A:
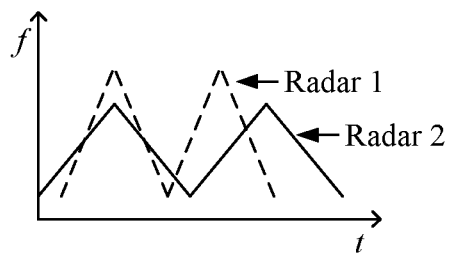
FIG. 7A and FIG. 7B are schematic diagrams of a possible solution according to an embodiment of this application.
Figure 7B:
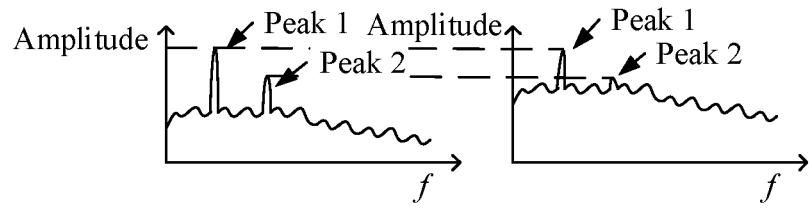

To resolve the foregoing problem, in a possible solution, that different radars have different parameters such as waveform slopes and cycles may be set. FIG. 7A is a schematic diagram of a possible solution. As shown in FIG. 7A, parameters such as a waveform slope and a transmit cycle of a radar 1 are inconsistent with those of a radar 2. Therefore, even if the radar 1 receives a signal of the radar 2, due to inconsistent waveforms, when processing is performed by a mixer, that is, when a difference between frequencies of two signals is obtained, an intermediate frequency signal with a constant frequency is not generated. Because only the intermediate frequency signal with the constant frequency is represented as a peak signal in spectrum analysis, the method can be used to reduce a probability that a ghost occurs. However, if the radar 1 receives the signal of the radar 2, and an interference signal falls within an effective received intermediate frequency bandwidth after processing is performed by the mixer, strength of the interference signal is increased. Referring to FIG. 7B, after a level of the interference signal is raised, an original target is drowned by interference. FIG. 7B is a schematic diagram of a result of a possible false alarm. A consequence is that an obstacle ahead of a vehicle is not detected, and a false alarm is generated. This has an adverse impact on driving safety of the vehicle, particularly on safety of an unmanned driving vehicle.

Figure 8A:
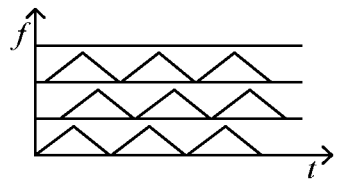
FIG. 8A and FIG. 8B are schematic diagrams of another possible solution according to an embodiment of this application.
Figure 8B:
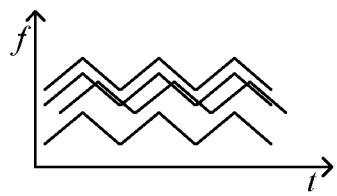

FIG. 8A is a schematic diagram of another possible solution. A technology used in the solution is a radar waveform frequency shift technology. If a radar detects, on a sweeping frequency band of the radar, interference generated by another radar, the radar shifts to another sweeping frequency band to avoid interference between a plurality of radars. A frequency shift interval in the frequency shift technology may be greater than a sweeping bandwidth of the radar. As shown in FIG. 8A, in this case, all radar waveforms are totally divided in a frequency domain, and there is no overlapping. However, setting the frequency shift interval causes occupation of a large quantity of frequency domain resources. Limited frequency domain resources are allocated to a vehicle-mounted radar. Alternatively, as shown in FIG. 8B, the frequency shift technology is still used. However, after detecting, on an operating frequency band, interference generated by another radar, the radar performs random frequency shift (shift). FIG. 8B is a schematic diagram of still another possible solution. In this case, interference can be reduced to a degree. However, fully random frequency shift inevitably causes a ghost that occurs because two radars waveforms existing after frequency shift is performed are excessively close to each other in the frequency domain, or missing detection of an object due to an increase of strength of an interference signal.

It should be noted that, in this embodiment of this application, when a frequency difference is compared with a threshold, an absolute value of the difference is used, and whether the difference is positive or negative is not considered. The difference may be used to distinguish between a positive value and a negative value. For example, when whether an intermediate frequency is positive or negative is determined, the difference may be positive or negative.

Therefore, this embodiment of this application provides a detection method, to resolve a problem of mutual interference between a plurality of radars by transmitting a radar signal through frequency division, and improve utilization of frequency domain resources. In this method, in a same frequency domain resource, there can be no mutual interference between as many radars as possible, or the mutual interference can be reduced.

Figure 9:
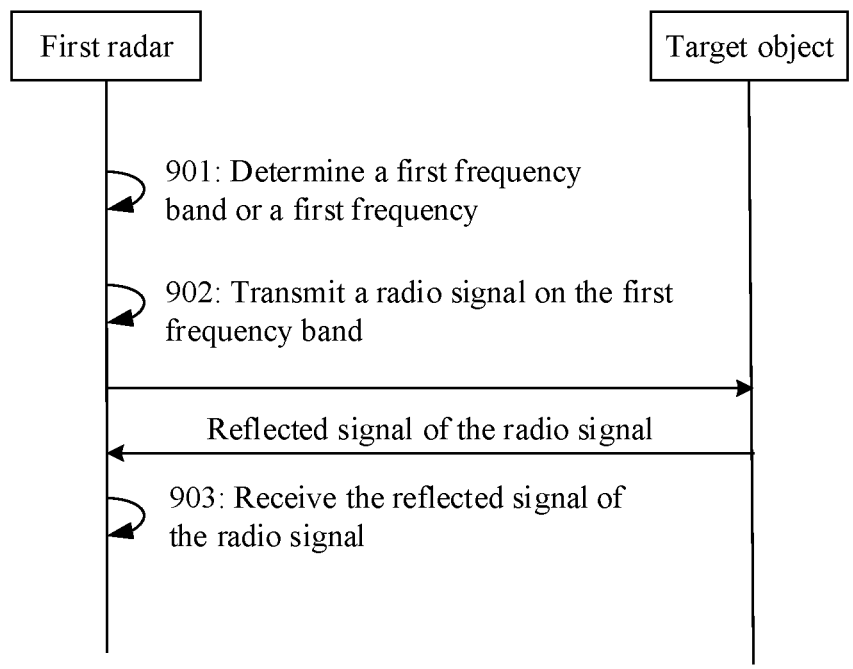
FIG. 9 is a schematic flowchart of a method for detecting a target object by using a radio signal according to an embodiment of this application.

FIG. 9 is a schematic flowchart of a possible method for detecting a target object by using a radio signal. With reference to FIG. 9, the following uses an example to describe the method for detecting a target object by using a radio signal provided in this embodiment of this application. The method may be applied to a first apparatus. It should be noted that the first apparatus may be an apparatus independent of or integrated into a first radar (or a first detector or a first detection apparatus). For example, the first apparatus may be a group of chips independent of or integrated into the first radar. Alternatively, the first apparatus may be a group of modules or elements independent of or integrated into the first radar. Alternatively, the first apparatus may be a group of software modules that are stored in a computer readable storage apparatus. For ease of description, the following uses a radar as an example to describe the solution. The radar may be replaced with a detector or a detection apparatus. A signal transmit cycle of the first radar is $T_{ci}$.

The method may include steps 901 and 902.

901: Determine a first frequency band, where the first frequency band is one of N frequency bands.

A bandwidth of the first frequency band is a sweeping bandwidth of a radio signal transmitted by the first radar. A sweeping bandwidth of a radar in this application is understood as a sweeping bandwidth of a signal transmitted by the radar.

Further, optionally, the first frequency band may be an initial sweeping frequency band (namely, the first transmit cycle) of the radio signal, or may be a sweeping frequency band in any transmit cycle. Further, for the first radar, either the initial sweeping frequency band or the sweeping frequency band in any transmit cycle is one of the N frequency bands.

Further, when the radar is started, the radar may randomly select a frequency band from the N frequency bands as a sweeping frequency band in the first transmit cycle, or may select a frequency band from the N frequency bands as a sweeping frequency band in the first transmit cycle according to a preset rule. In a scenario in which the N frequency bands have a plurality of frequency band subsets respectively corresponding to different radars, when the radar is started, the radar may select a frequency band from a corresponding frequency band subset as a sweeping frequency band in the first transmit cycle randomly or according to a preset rule. For specific scenario descriptions, refer to the following descriptions.

Further, in a specific transmit cycle, if the radar detects that there is no interference signal on one or more frequency bands in the N frequency bands or on one or more frequency bands in the frequency band subset, the radar may transmit a signal in the transmit cycle or a next transmit cycle by using one frequency band in the one or more frequency bands as a sweeping frequency band. One frequency band in the one or more frequency bands may be determined randomly, or may be determined according to a preset rule. This is not limited herein.

In a possible implementation, alternatively, step 901 may be determining a first frequency, where the first frequency is a frequency of a first frequency channel number of N frequency channel numbers, and the "frequency channel number" is a point or a location in a frequency domain.

It should be noted that the first frequency and the sweeping bandwidth of the radio signal jointly define the first frequency band.

Optionally, the first frequency may be a lowest frequency, a highest frequency, or a center frequency of the first frequency band. This is not limited herein.

In a possible implementation, the N frequency bands or the N frequency channel numbers may be specified in a standard or a protocol, or may be specified in laws and regulations. Alternatively, the N frequency bands or the N frequency channel numbers may be configured, agreed, or defined in advance. Before transmitting the radio signal, the first apparatus may determine the first frequency band in the N frequency bands or the first frequency channel number in the N frequency channel numbers, to transmit the signal.

902: Transmit the radio signal on the first frequency band, where any frequency band in the N frequency bands partially overlaps at least one frequency band in the other N−1 frequency bands.

"Partial overlapping" herein means that two frequency bands overlap in the frequency domain and do not totally overlap, and one frequency band cannot totally include the other frequency band. This design can avoid a waste of frequency domain resources that is caused because sweeping frequency bands of a plurality of radars are totally separated in the frequency domain, so that frequency resources can be effectively used, and higher anti-interference performance is implemented by using fewer frequency resources.

Further, as shown in FIG. 9, the method may further include the following step:

903: Receive a reflected signal of the radio signal.

Further, the transmit signal is a signal obtained by reflecting the radio signal by the target object, but is not limited to at least one of location information, speed information, and angle information. For details, refer to the foregoing explanation.

In a possible implementation, an absolute value of a difference between lowest frequencies of any two frequency bands in the N frequency bands is not less than a first threshold F, and N is a positive integer.

In a possible implementation, an absolute value of a difference between a lowest frequency of any frequency band other than the first frequency band in the N frequency bands and the lowest frequency of the first frequency band is a positive integer multiple of the first threshold F. Alternatively, an absolute value of a frequency difference between any two frequency channel numbers in the N frequency channel numbers is a positive integer multiple of the first threshold F. Alternatively, the N frequency channel numbers are distributed at equal intervals in the frequency domain, and an absolute value of a frequency difference between two adjacent frequency channel numbers in the frequency domain is the first threshold F. The two adjacent frequency channel numbers mean that in the frequency domain, no frequency channel number between the two frequency channel numbers is also included in the N frequency channel numbers. For the following explanation of two adjacent frequency channel numbers in the N frequency channel numbers, refer to the explanation herein. Further, bandwidths of the N frequency bands are the same. It should be noted that, for the foregoing N frequency channel numbers, the absolute value of the frequency difference between the two adjacent frequency channel numbers in the frequency domain is less than the bandwidth of the first frequency band. Otherwise, total frequency division in the frequency domain is still caused, and low utilization of frequency domain resources is caused.

This design manner may be applied to a plurality of radars that have a same attribute or that are of a same type, and a plurality of radars that have different attributes or that are of different types.

Optionally, the plurality of radars that have a same attribute or that are of a same type meet at least one of the following: transmit signals have a same sweeping bandwidth and a same transmit cycle, frequency change amounts of the transmit signals are the same ("same" herein means that the change amounts are totally the same, that is, the change amounts are all positive values or negative values) per unit of time, and maximum ranging distances are the same. In this case, the plurality of radars may be considered to have a same attribute or be of a same type. That is, it may be understood that the first threshold F is a threshold corresponding to the plurality of radars, or is a threshold determined based on one or more parameters or attributes corresponding to the plurality of radars. There is a direct or indirect correspondence between the first threshold and the one or more parameters or attributes. The one or more parameters or attributes may include one or more of the bandwidth of the first frequency band, a transmit cycle, a transmit frequency, a change amount of the transmit frequency per unit of time, and the like. In this design manner, all radars that have a same attribute or that are of a same type can be configured or defined together. An implementation is simple, and an error rate is low. For example, if all radars have a same attribute or are of a same type, the N frequency bands or frequency channel numbers are defined together. For another example, a corresponding frequency band subset or frequency channel number is defined for each type of radar.

In a possible implementation, the N frequency bands include at least two frequency bands with different bandwidths.

Further, the N frequency bands may include a second frequency band and a third frequency band, an absolute value of a difference between lowest frequencies of the second frequency band and the third frequency band is not less than a first threshold F, and a bandwidth of the second frequency band is different from a bandwidth of the third frequency band.

Further, the N frequency bands include at least two frequency band subsets, and each frequency band subset includes at least two frequency bands. Optionally, the N frequency bands include a second frequency band subset and a third frequency band subset. The second frequency band is a frequency band in the second frequency band subset. The third frequency band is a frequency band in the third frequency band subset. A bandwidth of any frequency band in the second frequency band subset is a second bandwidth. A bandwidth of any frequency band in the third frequency band subset is a third bandwidth. The second bandwidth is different from the third bandwidth.

This design manner may be applied to a plurality of radars that have different attributes or that are of different types. For example, the radars are divided into a plurality of groups based on the attributes or the types of the radars. The division is only logical division, there may be no substantive group, and the division is only used to identify different types of radars.

For ease of description, herein, a radar that may use the first frequency band as a sweeping frequency band is referred to as a first-type radar, and the third frequency band may be used for a second-type radar. Optionally, at least one fourth frequency band may further exist in the N frequency bands, and the fourth frequency band may be used for a fourth-type radar. In this embodiment of this application, frequency bands that are included in the N frequency bands and that are used for a specific quantity of types of radars are not limited. However, processing for all types of radars is the same or similar. For details, refer to related content of the first-type radar. This design manner is applicable to a plurality of radars that have different attributes or that are of different types. Therefore, during implementation of this design manner, the step that the radar determines the sweeping frequency band in the N frequency bands in the first transmit cycle or a specific transmit cycle and that is mentioned above should be understood as determining the sweeping frequency band from frequency bands that are in the N frequency bands and that are used for same types of radars, instead of from all the N frequency bands.

For ease of description of this embodiment, the following describes the optional design by using an example, and is not intended to limit the protection scope. In the example, the N frequency bands include only frequency bands used for the first-type radar and the second-type radar.

In the example, the first frequency band is a frequency band in a first frequency band subset. The first frequency band subset is a subset of the N frequency bands. An absolute value of a difference between lowest frequencies of any two frequency bands in the first frequency band subset is a positive integer multiple of a second threshold F'. The first frequency band subset corresponds to the first detection apparatus, and the first frequency band subset is one of the second frequency band subset and the third frequency band subset. Herein, that the first frequency band subset corresponds to the first detection apparatus means that the first detection apparatus transmits a radio signal on a frequency band in the first frequency band subset. Based on the explanation in the foregoing first optional manner, the first detection apparatus transmits a radio signal by using any frequency band in the first frequency band subset, and the second threshold F' corresponds to the first detection apparatus, that is, the second threshold F' corresponds to the first-type radar. For specific explanation and analysis, refer to the foregoing descriptions. In this design manner, available frequency bands or available frequency channel numbers that are applied to a plurality of types of radars can be preset or predefined for use and reference by various types of radars, without independently setting or defining a frequency band or a frequency channel number for each type of radar. For example, a plurality of frequency bands or frequency channel numbers may be defined together in the standard for use by various types of radars.

It should be noted herein that a value relationship between highest frequencies of frequency bands with a same bandwidth is the same as a value relationship between lowest frequencies of the frequency bands. For ease of description, in this embodiment of this application, a relationship with the second threshold F' is described by using the relationship between the lowest frequencies. However, a person skilled in the art may learn that a relationship between the highest frequency and the second threshold F' is also determined.

In a possible implementation, a transmit cycle of the radio signal is T, and the transmitting the radio signal on the first frequency band includes transmitting the radio signal on the first frequency band in a current transmit cycle.

Further, optionally, the radio signal is transmitted on the first frequency band in two or more consecutive transmit cycles. For example, if there is no interference on the first frequency band currently, for example, no interference signal is detected, or a detected interference signal is extremely weak and does not cause substantial interference, the first apparatus may continue signal transmission in a plurality of subsequent consecutive transmit cycles by using the first frequency band, until interference is detected.

For example, if interference is detected on the first frequency band in an $n^{th}$ transmit cycle, the fourth frequency band is determined in an $(n+1)^{th}$ transmit cycle. The fourth frequency band is a frequency band that is in the N frequency bands and that is different from the first frequency band. An absolute value of a difference between a lowest frequency of the fourth frequency band and the lowest frequency of the first frequency band is a positive integer multiple of the second threshold F'.

For another example, if interference is detected on the fourth frequency band (a sweeping frequency band in an $(n-1)^{th}$ transmit cycle) in the $(n-1)^{th}$ transmit cycle, the first frequency band is determined in an $n^{th}$ transmit cycle. The fourth frequency band is a frequency band that is in the N frequency bands and that is different from the first frequency band. An absolute value of a difference between a lowest frequency of the fourth frequency band and the lowest frequency of the first frequency band is a positive integer multiple of the second threshold F'.

Further, the fourth frequency band and the first frequency band belong to the first frequency band subset.

In this manner, the sweeping frequency band can be shifted after interference is detected, thereby improving detection efficiency.

In an optional design, step 902 further includes transmitting the radio signal on the first frequency band by using the first frequency as an initial frequency.

In first implementation, the first frequency is the lowest frequency of the first frequency band. Further, in the current transmit cycle, a transmit frequency of the radio signal increases with time linearly. A change with time described herein means changing over time (backward). For example, a waveform of the radio signal is a sawtooth wave.

In second implementation, the first frequency is the highest frequency of the first frequency band. Further, in the current transmit cycle, a transmit frequency of the radio signal decreases with time linearly. For example, a waveform of the radio signal is a sawtooth wave.

In third implementation, the first frequency is the center frequency of the first frequency band.

In the foregoing several types of implementation, a waveform of the sawtooth wave is used as an example for description. This embodiment of this application may be further applied to another waveform such as a triangular wave. For any waveform or radio signal type, the foregoing transmit cycle is a transmit cycle of a complete waveform.

It should be noted that, in this embodiment of this application, the foregoing N frequency channel numbers may be N frequency shift rasters. That is, an initial operating frequency of the radar (or an initial frequency in one transmit cycle) can be selected only from the N frequency shift rasters. Different radars may use different frequency shift rasters as initial transmit frequency locations to effectively avoid interference. Frequencies of the N frequency channel numbers are candidate initial frequencies used to transmit a radar signal. That is, the initial operating frequency of the radar can be selected only from the N frequency channel numbers.

It may be learned from the foregoing descriptions of this embodiment of this application that the first threshold may be calculated in a plurality of manners. A same calculation manner or different calculation manners may be used for a plurality of types of radars, and the calculation manner may be determined based on an attribute of each type of radar or a specific application scenario. This is not limited herein.

In a possible implementation, a value of the first threshold F is determined based on at least one of the following: when a second detection apparatus is an interfering source, a maximum interference tolerance distance of the first detection apparatus, a sweeping bandwidth of a radio signal of the first detection apparatus, a maximum ranging distance of the first detection apparatus, and a transmit cycle of the radio signal of the first detection apparatus, or when the first detection apparatus is an interfering source, a maximum interference tolerance distance of a second detection apparatus, a sweeping bandwidth of a radio signal of the second detection apparatus, a maximum ranging distance of the second detection apparatus, and a transmit cycle of the radio signal of the second detection apparatus. For details, refer to the foregoing explanation.

In a possible implementation, a value of the first threshold F meets the following formula:

$$F = \max(|\Delta f_1|, |\Delta f_2|, |\Delta f_3|, |\Delta f_4|) + \sigma.$$

Figure 10:
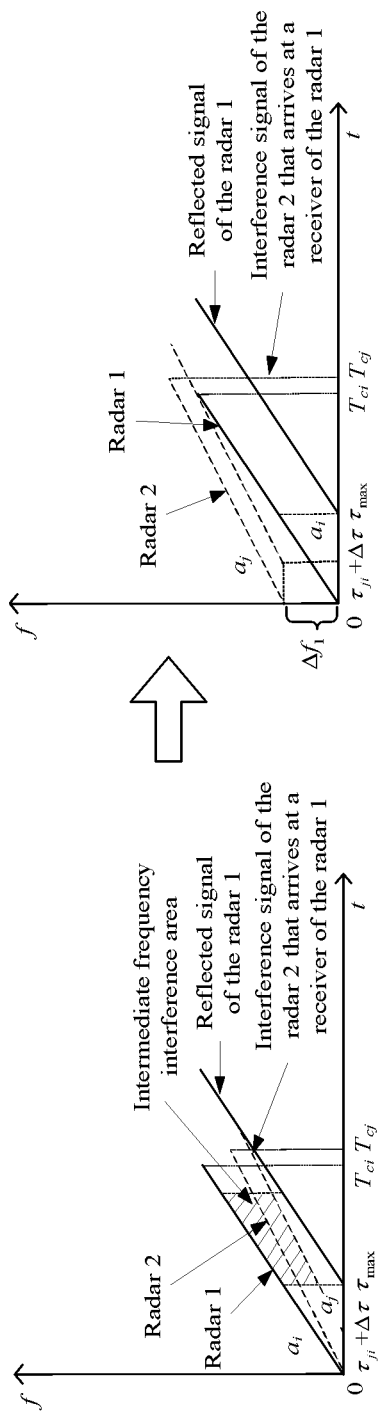
FIG. 10 is a first schematic diagram of a frequency shift solution according to an embodiment of this application.

In the foregoing formula, $\Delta f_1$ is a condition that needs to be met when the second detection apparatus shifts in a frequency-increasing direction (as shown in FIG. 10) when the transmit signal of the second detection apparatus has a lower slope, the transmit signal of the first detection apparatus has a higher slope, and the low slope interferes with the high slope, that is, $$\Delta f_1 = a_i T_{ci} - a_j T_{cj} + a_j(\tau_{ji} + \Delta\tau) = B_i - B_j + \frac{B_j\left(\dfrac{dif_{max}^{ji}}{c} + \Delta\tau\right)}{T_{cj}}.$$

For the scenario shown in FIG. 10, an amount by which the second detection apparatus shifts in the frequency-increasing direction is greater than $\Delta f_1$, so that mutual interference between the second detection apparatus and the first detection apparatus can be avoided.

Figure 11:
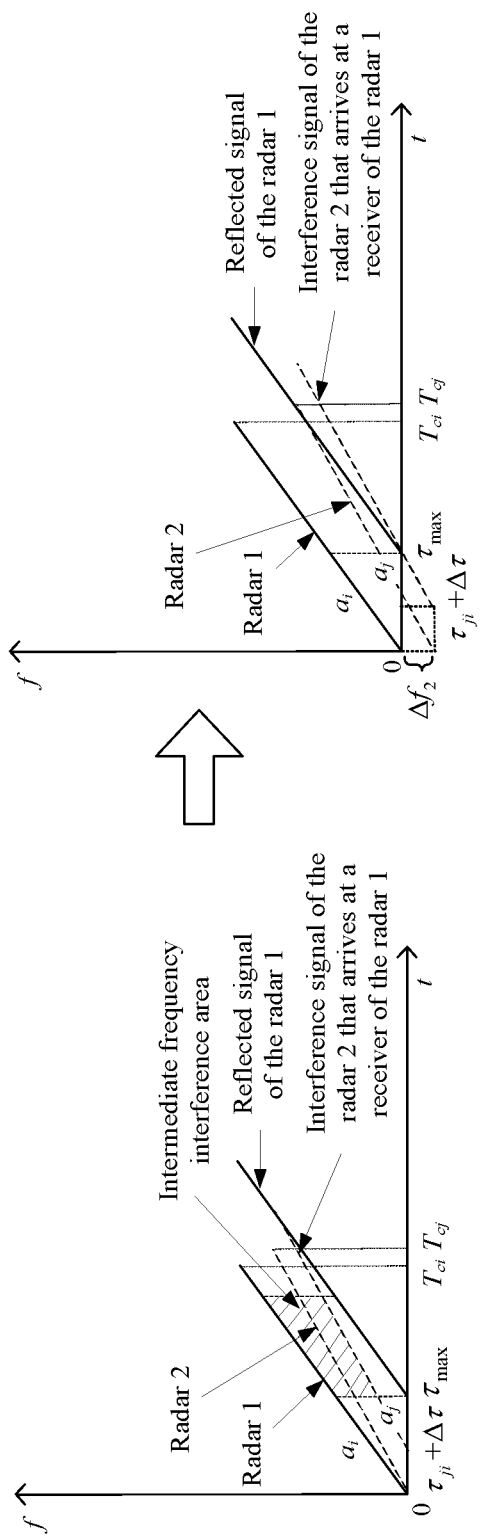
FIG. 11 is a second schematic diagram of a frequency shift solution according to an embodiment of this application.

In the foregoing formula, $\Delta f_2$ is a condition that needs to be met when the second detection apparatus shifts in a slope-decreasing direction (as shown in FIG. 11) when the transmit signal of the second detection apparatus has a lower slope, the transmit signal of the first detection apparatus has a higher slope, and the low slope interferes with the high slope, that is, $$\Delta f_2 = a_j(\tau_{max}^i - \tau_{ji} - \Delta\tau) = \frac{B_j}{T_{cj}}\left(\frac{2d_{max}^i}{c} - \frac{dif_{max}^{ji}}{c} - \Delta\tau\right).$$

For the scenario shown in FIG. 11, an amount by which the second detection apparatus shifts in the frequency-increasing direction is greater than $\Delta f_2$, so that mutual interference between the second detection apparatus and the first detection apparatus can be avoided.

Figure 12:
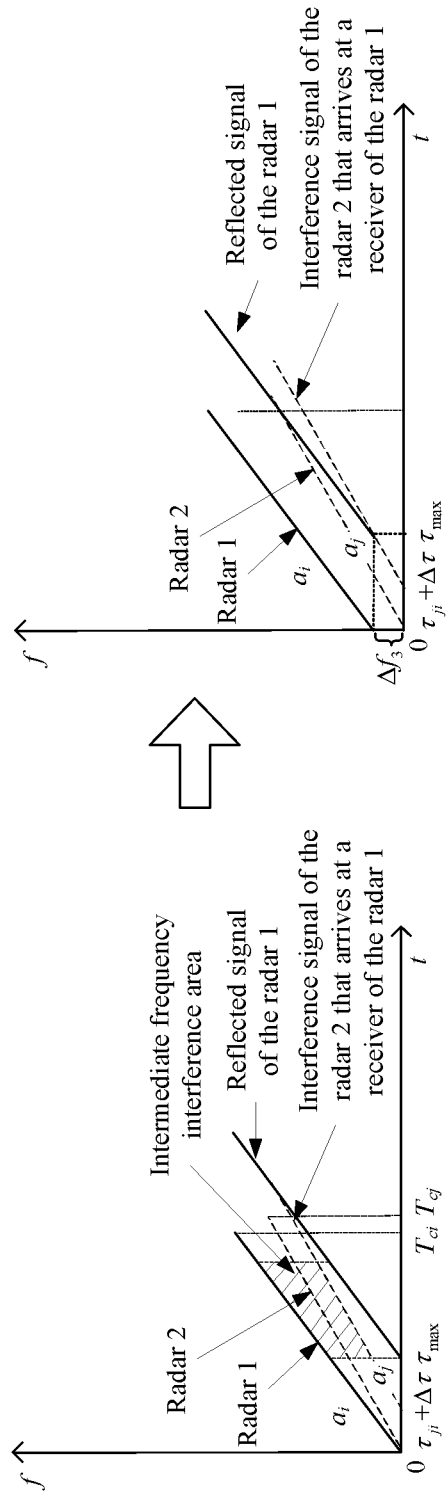
FIG. 12 is a third schematic diagram of a frequency shift solution according to an embodiment of this application.

In the foregoing formula, $\Delta f_3$ is a condition that needs to be met when the first detection apparatus shifts in a slope-increasing direction (as shown in FIG. 12) when the transmit signal of the second detection apparatus has a lower slope, the transmit signal of the first detection apparatus has a higher slope, and the low slope interferes with the high slope, that is, $$\Delta f_3 = a_j(\tau_{ij} + \Delta\tau) = \frac{B_j}{T_{cj}}\left(\frac{dif_{max}^{ij}}{c} + \Delta\tau\right).$$

For the scenario shown in FIG. 12, an amount by which the second detection apparatus shifts in the frequency-increasing direction is greater than $\Delta f_3$, so that mutual interference between the second detection apparatus and the first detection apparatus can be avoided.

Figure 13:
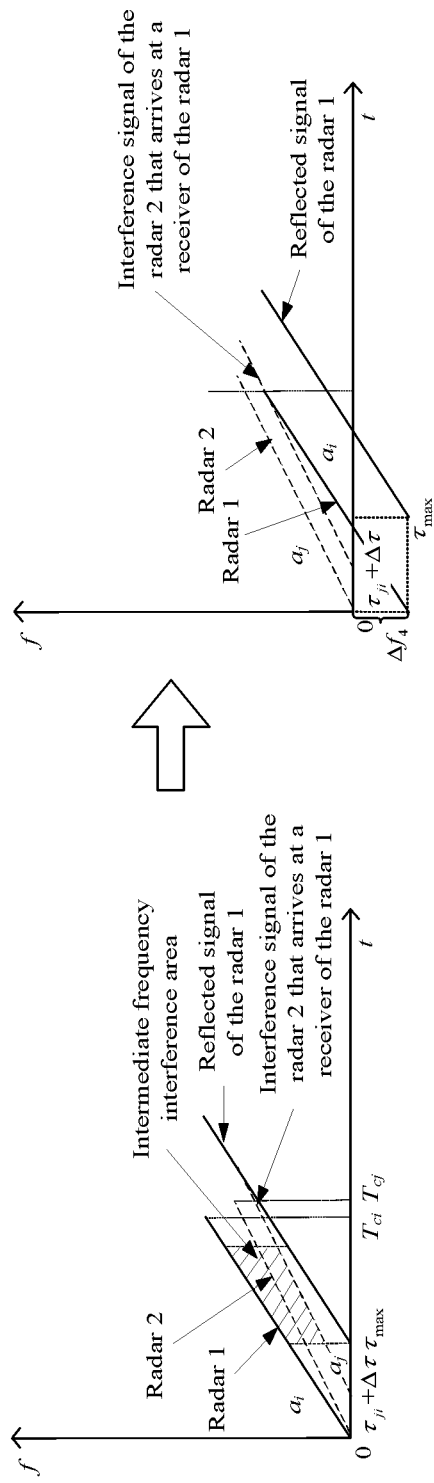
FIG. 13 is a fourth schematic diagram of a frequency shift solution according to an embodiment of this application.

In the foregoing formula, $\Delta f_4$ is a condition that needs to be met when the first detection apparatus shifts in a slope-decreasing direction (as shown in FIG. 13) when the transmit signal of the second detection apparatus has a higher slope, the transmit signal of the first detection apparatus has a lower slope, and the high slope interferes with the low slope, that is, $$\Delta f_4 = a_i(T_{ci} - \tau_{ij} - \Delta\tau) - a_j(T_{cj} - \tau_{max}^j) =$$

$$\frac{B_i}{T_{ci}}\left(T_{ci} - \frac{dif_{max}^{ij}}{c} - \Delta\tau\right) - \frac{B_j}{T_{cj}}\left(T_{cj} - \frac{2d_{max}^j}{c}\right).$$

For the scenario shown in FIG. 13, an amount by which the second detection apparatus shifts in the frequency-increasing direction is greater than $\Delta_4$, so that mutual interference between the second detection apparatus and the first detection apparatus can be avoided.

$a_i$ is the slope of the transmit signal of the first detection apparatus, $a_j$ is the slope of the transmit signal of the second detection apparatus, $B_i$ is the sweeping bandwidth of the radio signal of the first detection apparatus, $B_j$ is the sweeping bandwidth of the radio signal of the second detection apparatus, $B_i > B_j$, $\text{dif}_{max}^{ji}$ is the maximum interference tolerance distance of the first detection apparatus when the second detection apparatus is an interfering source, $\tau_{ji}$ is a delay required when a receiver of the first detection apparatus receives an interference signal of the second detection apparatus, $\Delta\tau$ is a transmission timing error, $d_{max}^{i}$ is the maximum ranging distance of the first detection apparatus, $\tau_{max}^{i}$ is an echo delay corresponding to the maximum ranging distance of the first detection apparatus, $\text{dif}_{max}^{ij}$ is the maximum interference tolerance distance of the second detection apparatus when the first detection apparatus is an interfering source, $\tau_{ij}$ is a delay required when a receiver of the second detection apparatus receives an interference signal of the first detection apparatus, $\Delta\tau$ is the transmission timing error, $d_{max}^{j}$ is the maximum ranging distance of the second detection apparatus, $\tau_{max}^{j}$ is an echo delay corresponding to the maximum ranging distance of the second detection apparatus, c is the speed of light, $T_{ci}$ is the transmit cycle of the radio signal of the first detection apparatus, $T_{cj}$ is the transmit cycle of the radio signal of the second detection apparatus, and σ is a predetermined constant or a preconfigured constant.

Considering that slopes of radars in different manufacturers are different, and a frequency shift direction may be positive or negative, a common frequency shift threshold F is used, so that mutual interference between the radars is reduced.

A person skilled in the art may learn that, in one case, inaccuracy of a radar apparatus may lead to a frequency error of a transmit signal. For example, an error caused by a transmit frequency of 80 GHz is approximately 4 megahertz (MHz). In another case, a side lobe effect of the radar signal also causes a signal transmission error. In still another case, to ensure robustness of system running, an additional constant may be introduced. The constant is related to an attribute or a type of the radar, or may be predefined or preconfigured. This is not limited herein. In a specific communication scenario, another possible signal transmission error may further exist. In this implementation, the constant σ may be a sum of frequency change amounts caused by one or more of all possible errors. After the constant is introduced, radar signal detection can be more accurate, and system running can be more stable.

For the cases shown in FIG. 10, FIG. 11, FIG. 12, and FIG. 13, when the second detection apparatus performs frequency shift, because F is greater than any one of $\Delta f_1$, $\Delta f_2$, $\Delta f_3$, and $\Delta f_4$, mutual interference between the second detection apparatus and the first detection apparatus can be effectively avoided after frequency shift F is performed.

It should be noted that the foregoing method is also applicable to transmit signals that have a same transmit slope. When F calculated in the foregoing method is applied to the first radar detection apparatus and the second radar detection apparatus that have a same transmit signal slope, mutual interference between the two radar detection apparatuses can be still avoided.

In a possible implementation, $T_{ci} = T_{cj} = T_c$.

In a possible implementation, the first detection apparatus and the second detection apparatus are different types of detection apparatuses, that is, the transmit signal of the first detection apparatus and the transmit signal of the second detection apparatus have different transmit slopes, and both the first detection apparatus and the second detection apparatus transmit radio signals on frequency bands in a same frequency band subset.

For example, a sweeping bandwidth of a radar 1 is 300 MHz, a transmit cycle of a radio signal is 10 microseconds (μs), a maximum delay corresponding to a maximum detection distance of 250 m is 1.67 μs, and a maximum tolerance distance is 650 m. A sweeping bandwidth of a radar 2 is 200 MHz, a transmit cycle of a radio signal is 10 μs, a maximum delay corresponding to a maximum detection distance of 250 m is 1.67 μs, a maximum interference tolerance distance is 650 m, and a transmission timing error is 60 nanoseconds (ns). Considering a GPS timing error of 60 ns and a frequency jitter of 4 MHz caused by a non-ideal factor of a radar component, the following is obtained by substituting the foregoing parameters into the foregoing formulas:

$$\Delta f_1 = 300 \text{ MHz} - 200 \text{ MHz} + \frac{200 \text{ MHz}\left(\frac{650m}{3\times 10^2 m/\mu s} + 60 \times 10^{-3}\mu s\right)}{10\mu s} \approx 145 \text{ MHz},$$

$$\Delta f_2 = \frac{200 \text{ MHz}}{10\mu s}\left(\frac{2\times 250m}{3\times 10^2 m/\mu s} - \frac{650m}{3\times 10^2 m/\mu s} - 60\times 10^{-3}\mu s\right) \approx -11 \text{ MHz},$$

$$\Delta f_3 = \frac{200 \text{ MHz}}{10\mu s}\left(\frac{650m}{3\times 10^2 m/\mu s} + 60\times 10^{-3}\mu s\right) \approx 45 \text{ MHz},$$

$$\text{and } \Delta f_4 = \frac{300 \text{ MHz}}{10\mu s}\left(10\mu s - \frac{650m}{3\times 10^2 m/\mu s} - 60\times 10^{-3}\mu s\right) - \frac{200 \text{ MHz}}{10\mu s}\left(10\mu s - \frac{2\times 250m}{3\times 10^2 m/\mu s}\right) \approx -67 \text{ MHz}.$$

In this case, F≈150 MHz. That is, when frequency shift of FMCW radars of the radar 1 and the radar 2 reaches 150 MHz, it can be ensured that there is no mutual interference between the radar 1 and the radar 2. This solution is also applicable to a radar having another slope, and details are not described herein again.

An available frequency domain range of a detection apparatus may be divided based on F obtained through calculation, to obtain frequency domain rasters for use when the detection apparatus transmits a radio signal.

Figure 14:
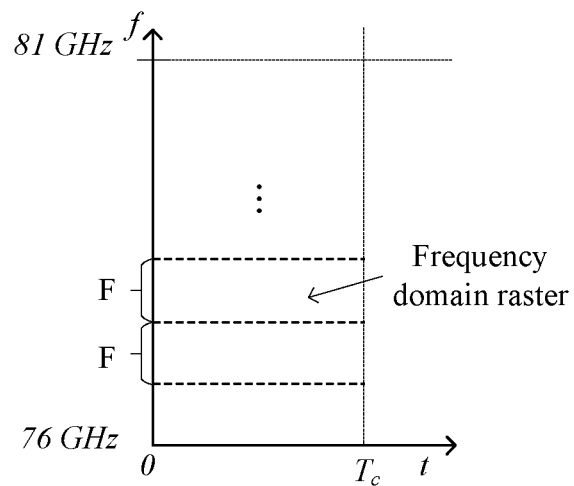
FIG. 14 is a schematic diagram of frequency band distribution in a frequency domain according to an embodiment of this application.

FIG. 14 is a schematic diagram of frequency band distribution in a frequency domain according to an embodiment of this application. An available frequency domain range of the radar detection apparatus is 76 GHz to 81 GHz. A 5 GHz bandwidth from 76 GHz to 81 GHz is divided based on the bandwidth F to obtain a plurality of frequency domain rasters for use by the radar detection apparatus.

For example, F≈115 MHz. The available frequency domain range of 76 GHz to 81 GHz may be divided into 42 rasters that occupy 42×115 MHz=4830 MHz and that can accommodate 42 radars (a slope range is 16 MHz/μs to 24 MHz/μs, and a transmit cycle is 10 μs).

In a possible implementation, the first detection apparatus and the second detection apparatus are a same type of detection apparatus, that is, the transmit signal of the first detection apparatus and the transmit signal of the second detection apparatus have a same transmit slope. The second threshold F' is greater than or equal to a frequency change range F1 of the radio signal within a first time length T1. During transmission of a radio signal, a frequency change range within a time period is an absolute value of a difference between a frequency value at a start moment of the time period and a frequency value at an end moment of the time period. Whether the difference is positive or negative is not considered, and is related to a waveform change. When the radio signal is an LFMCW, a transmit frequency of the radio signal changes with time linearly. Therefore, frequency changes of the LFMCW per unit of time are the same in a transmit cycle. Further, the frequency change range F1 of the radio signal within the first time length T1 is a product of the slope of the transmit signal and the time length T1, that is, $$F1 = \frac{\Delta F}{\Delta T} * T1. \frac{\Delta F}{\Delta T}$$

is a frequency change range of the LFMCW signal per unit of time, and may also be referred to as a waveform slope or the slop of the transmit signal (for the LFMCW, $$\frac{B}{T_c} \text{ and } \frac{\Delta F}{\Delta T}$$

have equal values).

Further, a value of the first time length T1 meets one of the following:

$T1=T2=2*d_{max}^i/c;$ $T1=M*T2=M*2*d_{max}^i/c;$ $T1=2*T2+T4=2*d_{max}^i/c+dif_{max}^i/c;$ $T1=\max(T2,T4)=\max(2*d_{max}^i/c,dif_{max}^i/c);$ $T1=T2+T3=2*d_{max}^i/c+\Delta\tau;$ $T1=M*T2+T3=M*2*d_{max}^i/c+\Delta\tau;$ $T1=T2+T3+T4=2*d_{max}^i/c+\Delta\tau+dif_{max}^i/c;$ and $T1=\max(T2,T4)+T3=\max(2*d_{max}^i/c,dif_{max}^ic)+\Delta\tau,$ where $d_{max}^i$ is the maximum detection distance of the first detection apparatus, $\Delta\tau$ is the transmission timing error, $dif_{max}^i$ is the maximum interference tolerance distance of the first detection apparatus, c is the speed of light, and M is an integer greater than or equal to 2. As described above, the first detection apparatus and the second detection apparatus are a same type of detection apparatus, and the transmit signals of the two apparatuses have a same transmit slope. Herein, $dif_{max}^i$ is the maximum interference tolerance distance of the first detection apparatus when another first detection apparatus having a same attribute or parameter as the first detection apparatus is used as an interfering source. In this case, $dif_{max}^i$ may be a fixed value, and may be determined based on the attribute or the parameter of the type of detection apparatus.

It should be noted that the second threshold F' is a difference threshold that is met by lowest frequencies of any two frequency bands in the first frequency band subset corresponding to a detection apparatus of a same type as the first detection apparatus. For a frequency band subset corresponding to another type of detection apparatus, the second threshold F' may also be determined by using the same method. It should be noted that in this case, parameters such as the maximum detection distance and the maximum interference tolerance distance are parameters of the type of detection apparatus.

In first implementation, the second threshold F' is equal to the frequency change range F1.

In second implementation, the second threshold F' is greater than the frequency change range F1. Further, the second threshold F' is not greater than the sweeping bandwidth of the radar.

Optionally, F' and F1 meet a formula: F'=F1+σ, σ is a predetermined constant or a preconfigured constant, and σ≥0.

In a possible implementation, the first detection apparatus and the second detection apparatus are different types of detection apparatuses, that is, the transmit signal of the first detection apparatus and the transmit signal of the second detection apparatus have different transmit slopes, and the first detection apparatus and the second detection apparatus transmit radio signals on frequency bands in different frequency band subsets.

For example, the first detection apparatus transmits a radio signal on a frequency band in the second frequency band subset, and the second detection apparatus transmits a radio signal on a frequency band in the third frequency band subset.

Figure 15:
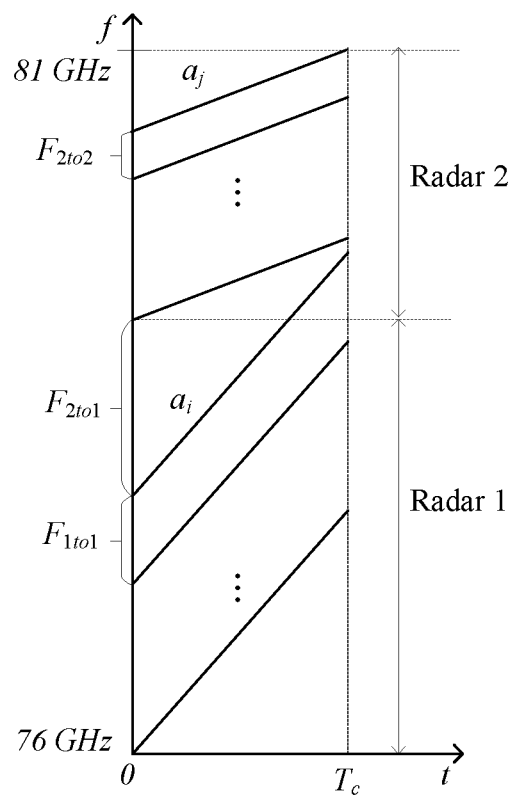
FIG. 15 is a schematic diagram of another type of frequency band distribution in a frequency domain according to an embodiment of this application.

FIG. 15 is a schematic diagram of another type of frequency band distribution in a frequency domain according to an embodiment of this application. A frequency domain range shared between a radar 1 and a radar 2 is 76 GHz to 81 GHz, and a 5 GHz bandwidth from 76 GHz to 81 GHz is divided to obtain a plurality of frequency domain rasters for use by the radar 1 and the radar 2. As shown in FIG. 15, the radar 1 uses a low spectrum, and the radar 2 fills a high frequency part that is left by the radar 1. It should be noted that the radar 2 may alternatively use a low spectrum, and the radar 1 fills a high frequency part that is left by the radar 2. This solution is also applicable to the case, and details are not described herein again. The "raster" mentioned in this embodiment of this application is only an indication description of a frequency domain location.

In the frequency domain raster division method shown in FIG. 15, the radar 1 and the radar 2 are radar detection apparatuses with different transmit slopes. The two types of radar detection apparatuses each transmit a radio signal in respective independent frequency domains. Further, the radar 1 transmits a radio signal in an available frequency domain of the radar 1 by using $F_{1to1}$ corresponding to the radar 1 as frequency shift. Similarly, the radar 2 transmits a radio signal in an available frequency domain of the radar 2 by using $F_{2to2}$ corresponding to the radar 2 as frequency shift. A radio signal is transmitted between the radar 1 and the radar 2 by using $F_{2to1}$ as frequency shift. In this way, a signal can be transmitted and a reflected signal can be received without mutual interference between same types of radars and different types of radars, to obtain a relatively reliable target detection result.

For example, a slope of a transmit signal of the radar 1 is 200 MHz/μs and a slope of a transmit signal of the radar 2 is 20 MHz/μs. When the radar 1 and another radar 1 have a same slope, a maximum detection distance of the radar 1 is 100 m, and a maximum interference tolerance distance is 180 m, considering that a GPS timing error is 60 ns, based on the foregoing frequency shift formula $T1=\max(T2,T4)+T3=\max(2*d_{max}^i/c,dif_{max}^i/c)+\Delta\tau$ in case of a same slope, frequency shift may be calculated as follows:

$$F1 = 200 \text{ MHz} \times \left[\max\left(\frac{2 \times 100m}{3 \times 10^2 m/\mu s}, \frac{180m}{3 \times 10^2 m/\mu s}\right) + 60 \times 10^{-3} \mu s\right] \approx$$
$$146 \text{ MHz}.$$

Considering other non-ideal factors, $F_{1to1}=150$ MHz is used as the frequency shift.

When the radar 2 and another radar 2 have a same slope, a maximum detection distance of the radar 2 is 250 m, and a maximum interference tolerance distance is 650 m, considering that the GPS timing error is 60 ns, similarly, based on the foregoing frequency shift formula in case of a same slope in the foregoing method, $$F1 =$$
$$20 \text{ MHz} \times \left[\max\left(\frac{2 \times 250m}{3 \times 10^2 m/\mu s}, \frac{650m}{3 \times 10^2 m/\mu s}\right) + 60 \times 10^{-3} \mu s\right] \approx 45 \text{ MHz}.$$

Considering other non-ideal factors, $F_{2to2}=50$ MHz is used as the frequency shift.

When the radar 2 and the radar 1 have different slopes, the maximum interference tolerance distance of the radar 1 is 850 m when the radar 2 is used as an interfering source and the radar 1 is used as an interfered source, and the maximum interference tolerance distance of the radar 2 is 125 m when the radar 1 is used as an interfering source and the radar 2 is used as an interfered source. Frequency shift required by no interference may be calculated by using a formula $F=\max(|\Delta f_1|,|\Delta f_2|,|\Delta f|_3,|\Delta f_4|)+\sigma$, where $$\Delta f_1 = \left(200\frac{\text{MHz}}{\mu s} - 20\frac{\text{MHz}}{\mu s}\right) \times 10\mu s +$$
$$20\frac{\text{MHz}}{\mu s}\left(\frac{850m}{3 \times 10^2 \frac{m}{\mu s}} + 60 \times 10^{-3} \mu s\right) \approx 1858 \text{ MHz},$$

$$\Delta f_2 = 20\frac{\text{MHz}}{\mu s}\left(\frac{2 \times 100m}{3 \times 10^2 m/\mu s} - \frac{850m}{3 \times 10^2 m/\mu s} - 60 \times 10^{-3} \mu s\right) \approx -45 \text{ MHz},$$

$$\Delta f_3 = 20\frac{\text{MHz}}{\mu s}\left(\frac{125m}{3 \times 10^2 m/\mu s} + 60 \times 10^{-3} \mu s\right) \approx 10 \text{ MHz},$$

and $\Delta f_4 = 200\frac{\text{MHz}}{\mu s}\left(10\mu s - \frac{125m}{3 \times 10^2 \frac{m}{\mu s}} - 60 \times 10^{-3} \mu s\right) -$
$$20\frac{\text{MHz}}{\mu s}\left(10\mu s - \frac{2 \times 250m}{3 \times 10^2 \frac{m}{\mu s}}\right) \approx 1738 \text{ MHz}.$$

F can be equal to 1860 MHz approximately through calculation. Considering other non-ideal factors, $F_{2to1}=1900$ MHz is used as the frequency shift.

In this case, frequency domain rasters can be obtained through division for the radar 1 and the radar 2 based on a formula $F_{1to1}(x-1)+B_2+F_{2to1}+F_{2to2}(y-1) \leq B$, where x is a quantity of rasters occupied by the radar 1, y is a quantity of rasters occupied by the radar 2, $B_2$ represents a bandwidth of the radar 2 (as described above, the radar 2 occupies an upper part of a frequency band, and if the radar 1 occupies the upper part of the frequency band, $B_2$ herein is replaced with $B_1$ that represents a bandwidth of the radar 1), and B represents a bandwidth (5 GHz) of the entire frequency band.

15x+5y≤310 can be obtained. Table 1 lists several possible combinations of raster quantities that are of the radar 1 and the radar 2 and that meet the inequality, so that the 5 GHz bandwidth is fully used. Each radar detection apparatus may operate based on a frequency allocated in Table 1, to eliminate mutual interference between different radars.

TABLE 1

| Quantity of available rasters of a radar 1 | Quantity of available rasters of a radar 2 |
|---|---|
| 20 | 2 |
| 19 | 5 |
| 18 | 8 |
| 17 | 11 |
| 16 | 14 |
| 15 | 17 |
| 14 | 20 |

In the following specific descriptions, one type of radar (transmit signals of radars of the type have a same slope) that uses N' frequency bands or frequency channel numbers in a same frequency band subset as a transmit frequency is used as an example to describe the foregoing calculation manner and implementation in detail. When the N' frequency channel numbers may be used for a plurality of types of radar, a same or similar principle is used by each type of radar to transmit a signal on a corresponding frequency band. It should be noted that a radar waveform is not limited in this application. An available bandwidth of a radar is predefined or preconfigured. For example, the bandwidth may be specified in laws and regulations. A sweeping bandwidth of the radar may be one of one or more predefined or preconfigured bandwidths, or may be determined by performance of the radar.

Figure 16:
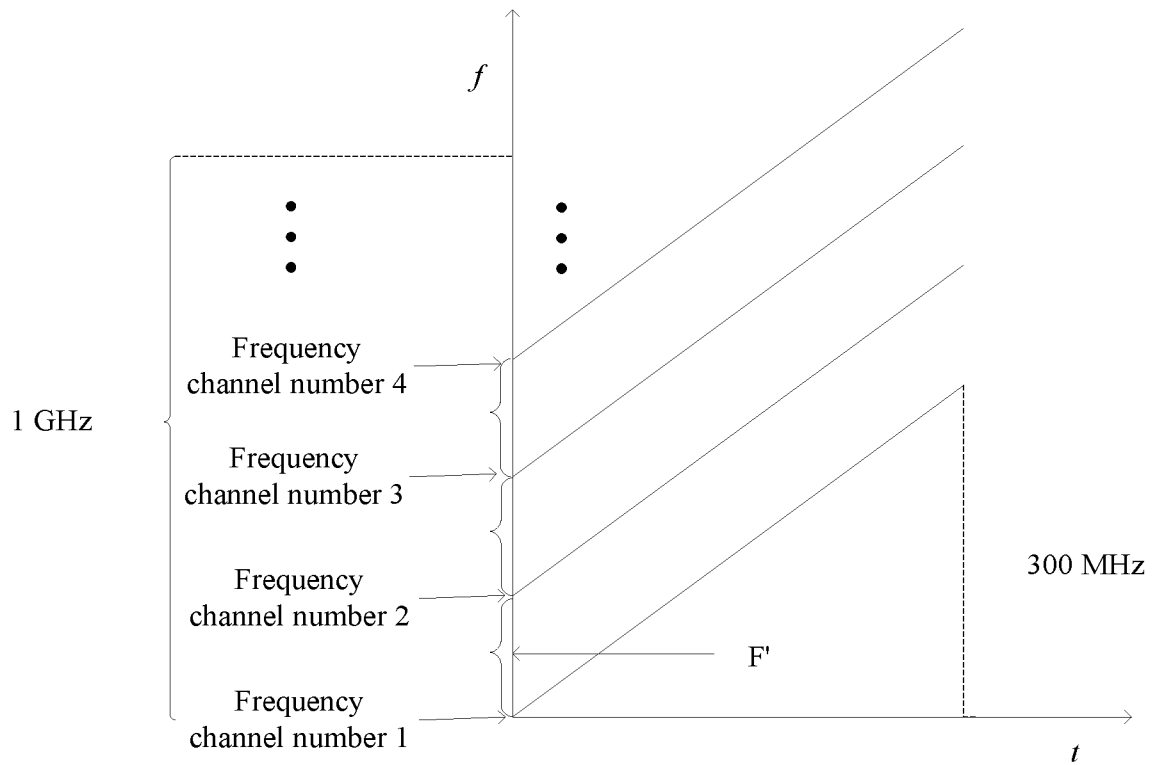
FIG. 16 is a schematic diagram in which a transmit frequency of a radar signal changes with time according to an embodiment of this application.

FIG. 16 is a schematic diagram in which a transmit frequency of a radar signal changes with time according to an embodiment of this application. As shown in FIG. 16, an available bandwidth of the radar is 1 GHz, a sweeping bandwidth is 300 MHz, and frequency channel numbers 1 to 4 belong to the N' frequency channel numbers and are distributed at equal intervals in the frequency domain, and each of the intervals is the second threshold F'. A quantity of frequency channel numbers is related to the second threshold F' and the available bandwidth, and the sweeping bandwidth of the radar signal cannot exceed a range of the available bandwidth.

It should be noted herein that when the radar starts to operate, the radar may randomly select a frequency band from the N' frequency bands as a sweeping frequency band. As shown in FIG. 16, the radar randomly selects a frequency channel number, and transmits a radar signal by using a frequency of the frequency channel number as an initial frequency on the frequency band defined by the frequency channel number and the sweeping bandwidth. The radar performs filtering detection on a received signal within a specific observation time period. If detecting an interference signal on each of the N' frequency bands, the radar keeps the sweeping frequency band of the radar unchanged. Alternatively, if detecting no interference signal on one or more of the N' frequency bands, the radar determines one of the one or more frequency bands as the sweeping frequency band in a next transmit cycle or a current transmit cycle. Alternatively, if detecting an interference signal on a sweeping frequency band in a current transmit cycle, the radar determines a frequency band from frequency bands other than the current sweeping frequency band in the N' frequency bands as a sweeping frequency band in a next transmit cycle. Further, if there are few vehicles, and a plurality of frequency bands in the N' frequency bands are in an idle state within a plurality of observation time periods, the observation time period is appropriately prolonged until most of the N' frequency bands are in a busy state again. In this case, the observation time period is shortened. The observation time period may be preconfigured.

In the following optional designs, F'=F1 is used as an example for description. For details of F'>F1, refer to the foregoing descriptions.

In a first optional design, F1 is the frequency change range of the radio signal within the first time length T1, T1=T2, and T2 is a delay corresponding to the maximum ranging distance $d_{max}^i$.

Figure 17:
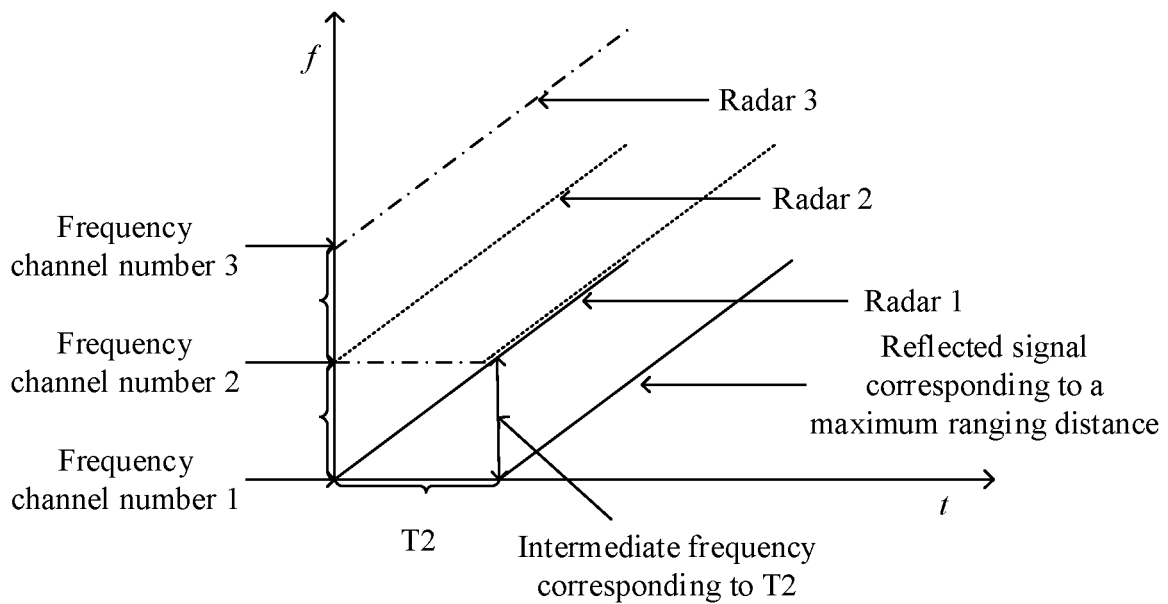
FIG. 17 is a first schematic diagram in which a transmit frequency/receive frequency of a radar signal changes with time according to an embodiment of this application.

FIG. 17 is a first schematic diagram in which a transmit frequency/receive frequency of a radar signal changes with time. As shown in FIG. 17, an intermediate frequency is linearly directly proportional to a target distance, and each radar has a maximum ranging distance that corresponds to a maximum intermediate frequency. It should be noted herein that the intermediate frequency includes a positive intermediate frequency and a negative intermediate frequency that are used to distinguish between a positive frequency difference and a negative frequency difference. For example, an absolute value of a frequency difference between a transmit signal of a radar 1 and a reflected signal of the radar 1 and an absolute value of a frequency difference between the transmit signal of the radar 1 and a transmit signal of a radar 2 are the same at a same moment. However, the difference between a frequency of the transmit signal of the radar 1 and a transmit frequency of the radar 2 is a negative value, namely, the negative intermediate frequency, and the difference between the frequency of the transmit signal of the radar 1 and a frequency of the reflected signal of the radar 1 is a positive value, namely, the positive intermediate frequency.

In the first optional design, a frequency domain interval between adjacent frequency channel numbers is a frequency domain change range within T2, namely, the intermediate frequency corresponding to the maximum ranging distance. In this case, frequency change curves of the transmit signal and a reflected signal of the radar 2 do not fall between frequency change curves of the transmit signal and the reflected signal of the radar 1, that is, dashed lines do not fall between two solid lines. If the radar has a capability of distinguishing between the positive intermediate frequency and the negative intermediate frequency, the ghost mentioned in the background does not occur. In addition, a low-pass filter in the radar filters out a frequency component higher than the intermediate frequency. A delay may be considered for the transmit signal of the radar 2. For specific considerations of the delay, refer to related descriptions in other optional designs below. As shown in FIG. 17, if the radar 1 receives a transmit signal of a radar 3 (a dash-dot line), after a mixer and the low-pass filter perform processing, an intermediate frequency signal generated by the radar 3 through interference is filtered out, and a signal to interference plus noise ratio (SINR) of the radar 1 is not affected.

For example, a maximum ranging distance of a radar is 200 m, a sweeping bandwidth of a radar signal is 300 MHz, and a transmit cycle of the radar signal is 14 μs. Based on the foregoing descriptions, an intermediate frequency $f_{1F}$ corresponding to the maximum ranging distance is $$f_{IF} = \frac{2 * d_{max}^i}{c} * \frac{\Delta F}{\Delta T} = \frac{2 * 200m}{3 * 10^2 m/\mu s} * \frac{300m}{14\mu s} = 28.6 \text{ MHz}.$$

In this case, F'=F1 is equal to 28.6 MHz.

If the radar cannot distinguish between the positive intermediate frequency and the negative intermediate frequency, for the radar 1, the absolute value of the frequency difference between the transmit signal of the radar 1 and the transmit signal of the radar 2 and the absolute value of the frequency difference between the transmit signal of the radar 1 and the reflected signal of the radar 1 are the same at a same moment. Further, even if T1 is greater than T2, if T1 is not large enough, the frequency change curve of the reflected signal of the radar 2 still falls into an area that is between the frequency change curves of the transmit signal of the radar 2 and the reflected signal of the radar 1 and that is shown in FIG. 17. Interference is caused, and a ghost is generated. In this case, a second optional design needs to be introduced.

In a second optional design, F1 is the frequency change range of the radio signal within the first time length T1, F1 is the frequency change range of the radio signal within the first time length T1, T1=M*T2, T2 is a delay corresponding to the maximum ranging distance $d_{max}$, and M is a positive number greater than 1, for example, M=2.

Figure 18:
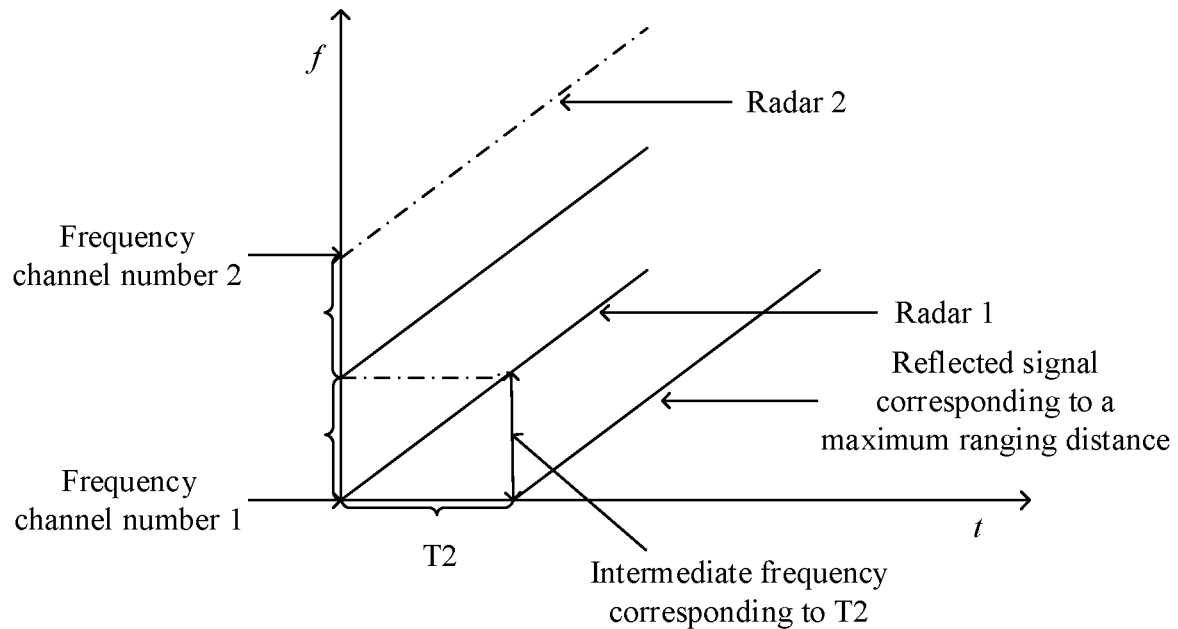
FIG. 18 is a second schematic diagram in which a transmit frequency/receive frequency of a radar signal changes with time according to an embodiment of this application.

FIG. 18 is a second schematic diagram in which a transmit frequency/receive frequency of a radar signal changes with time. As shown in FIG. 18, a frequency domain interval between adjacent frequency channel numbers is two times a frequency domain change range within T2, that is, is two times an intermediate frequency corresponding to the maximum ranging distance. In this case, frequency change curves of a transmit signal (a dash-dot line) and a reflected signal (not shown in the figure) of a radar 2 do not fall between frequency change curves of a transmit signal and a reflected signal of a radar 1, and do not fall into an area (between two upper solid lines) that causes a negative intermediate frequency. Even if the radar does not have a capability of distinguishing between a positive intermediate frequency and the negative intermediate frequency, the ghost mentioned in the background does not occur.

Based on an example in the first optional design, in the second optional design, F'=F1 is equal to two times $f_{1F}$, namely, 57.2 MHz.

Figure 19:
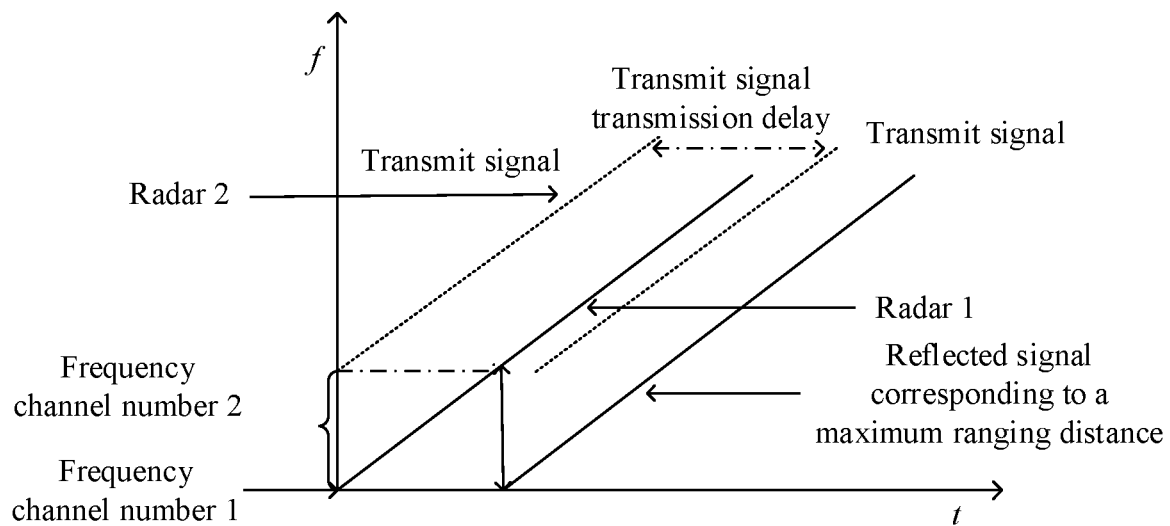
FIG. 19 is a third schematic diagram in which a transmit frequency/receive frequency of a radar signal changes with time according to an embodiment of this application.

A person skilled in the art may learn that, for two radars with a specific distance, even if the two radars start transmitting signals at the same time, a signal transmission delay exists due to the distance. Due to the transmission delay, sweeping frequency bands are different, and a transmit signal of one of the two radars that transmit signals at the same time causes interference to the other radar after the delay. FIG. 19 is a third schematic diagram in which a transmit frequency/receive frequency of a radar signal changes with time. Referring to FIG. 19, because a transmit signal transmission delay is generated for the transmit signal of the radar 2 due to a distance, the frequency change curve of the transmit signal after the transmission delay just falls into the area between the frequency change curves of the transmit signal and the reflected signal of the radar 1. Consequently, the transmit signal of the radar 2 interferes with the radar 1. To resolve the problem, when the second threshold F' is determined, a delay caused by the maximum interference tolerance distance needs to be further considered.

Further, the transmit signal of the radar 2 (an interfering radar) is received by the radar 1 after a specific transmission delay, and the transmit signal has a power equal to a noise power after the specific transmission delay. A distance corresponding to the transmission delay is the maximum interference tolerance distance. When the distance between the radars is greater than the maximum interference tolerance distance, the transmit signal of the radar 2 has a signal power less than the noise power after the delay, and does not cause substantial interference (which can be ignored). In addition, the reflected signal of the radar 2 may be attenuated to a degree due to reflection. Even if the reflected signal is received by the radar 1, the reflected signal has a power less than a power of the received transmit signal, and does not cause substantial interference either.

Based on the foregoing first optional design, in a third optional design, F1 is the frequency change range of the radio signal within the first time length T1, T1=2*T2+T4, T2 is a delay corresponding to the maximum ranging distance $d_{max}^i$, and T4 is a delay corresponding to the maximum tolerance distance of interference. Further, FIG. 20 is a fourth schematic diagram in which a transmit frequency/receive frequency of a radar signal changes with time.

Figure 20:
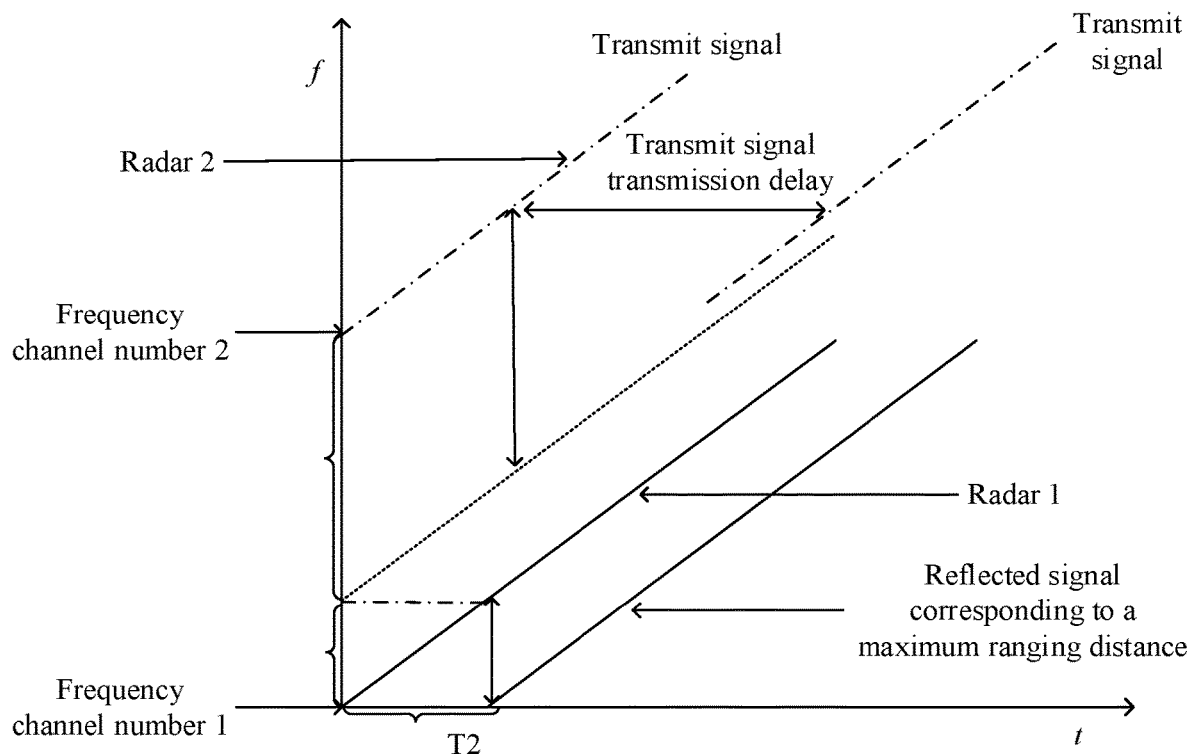
FIG. 20 is a fourth schematic diagram in which a transmit frequency/receive frequency of a radar signal changes with time according to an embodiment of this application.

As shown in FIG. 20, based on the first optional design, interference caused by a delay brought by a distance between radars is further avoided. A frequency range corresponding to T4 is further added to a frequency difference (a frequency domain interval existing when the N' frequency channel numbers are distributed at equal intervals) between adjacent frequency channel numbers 1 and 2 in the N' frequency channel numbers based on a frequency range corresponding to T2. When the radar can distinguish between a positive intermediate frequency and a negative intermediate frequency, the foregoing frequency difference may ensure that when a radar 2 transmits a radar signal at the frequency channel number 2 or at a location corresponding to a larger absolute value of the frequency difference, the transmit signal and a reflected signal after a corresponding delay do not interfere with the radar 1, that is, a frequency change curve of the reflected signal of the radar 2 does not fall into a range between two solid lines, thereby avoiding interference to the radar 1. Further, when a requirement on a distance resolution is not high, if the reflected signal attenuates greatly, even if the radar cannot distinguish between the positive intermediate frequency and the negative intermediate frequency, the reflected signal cannot cause interference to the radar 1.

Based on the foregoing second optional design, in a fourth optional design, F1 is the frequency change range of the radio signal within the first time length T1, T1=M*2*$d_{max}^i$/c+$dif_{max}^i$/c, and M is a positive number greater than 1, for example, M=2.

Further, with reference to the descriptions in the second optional design, a frequency range corresponding to T4 is further added to a frequency difference (a frequency domain interval existing when the N' frequency channel numbers are distributed at equal intervals) between adjacent frequency channel numbers 1 and 2 in the N' frequency channel numbers based on a frequency range corresponding to M*T2. In this way, a frequency change curve of a reflected signal of a radar 2 does not fall between frequency change curves of a transmit signal and a reflected signal of a radar 1, and does not fall into an area (an area between a dashed line and a solid line in FIG. 20) that causes a negative intermediate frequency. When the radar cannot distinguish between a positive intermediate frequency and the negative intermediate frequency, the foregoing frequency difference can ensure that when the radar 2 transmits a radar signal, the transmit signal and the reflected signal after a corresponding delay cause no interference to the radar 1.

When a transmission delay caused by a distance is considered, there is another possible design, that is, F1 is calculated by using a larger frequency change range in frequency change ranges within M*T2 and T4.

In a fifth optional design, F1 is the frequency change range of the radio signal within the first time length T1, and T1=max(T2,T4).

In the optional design, when the radar can distinguish between a positive intermediate frequency and a negative intermediate frequency, it can be ensured that radars operating on different sweeping frequency bands do not interfere with each other, to avoid a false alarm or an increase of strength of an interference signal. In addition, a maximum quantity of radars that can support no mutual interference within a limited available bandwidth can be implemented, and frequency band utilization is greatly increased. Further, when a requirement on a distance resolution is not high, if the maximum ranging distance is large enough, even if the radar cannot distinguish between the positive intermediate frequency and the negative intermediate frequency, in this design, a transmit signal and a reflected signal of a radar 2 may not cause interference to the radar 1.

A person skilled in the art may learn that radars of a same type have a same transmit cycle, and start moments of all transmit cycles are aligned in a time domain. This is an ideal transmit state. In a specific scenario, different radars may not actually start sending signals at a same moment, that is, there is an error between transmit moments of the radar 2 and the radar 1, that is, the signal of the radar 2 is transmitted later than the signal of the radar 1. There is a plurality of reasons for the error. For example, GPS precisions used for transmission timing are different, and the timing cannot be precise. For another example, timing precisions of the radars are different. There may also be another possible transmission timing error. The transmission timing error T3 in this embodiment of this application may include one or more of all possible transmission timing errors.

Figure 21A:
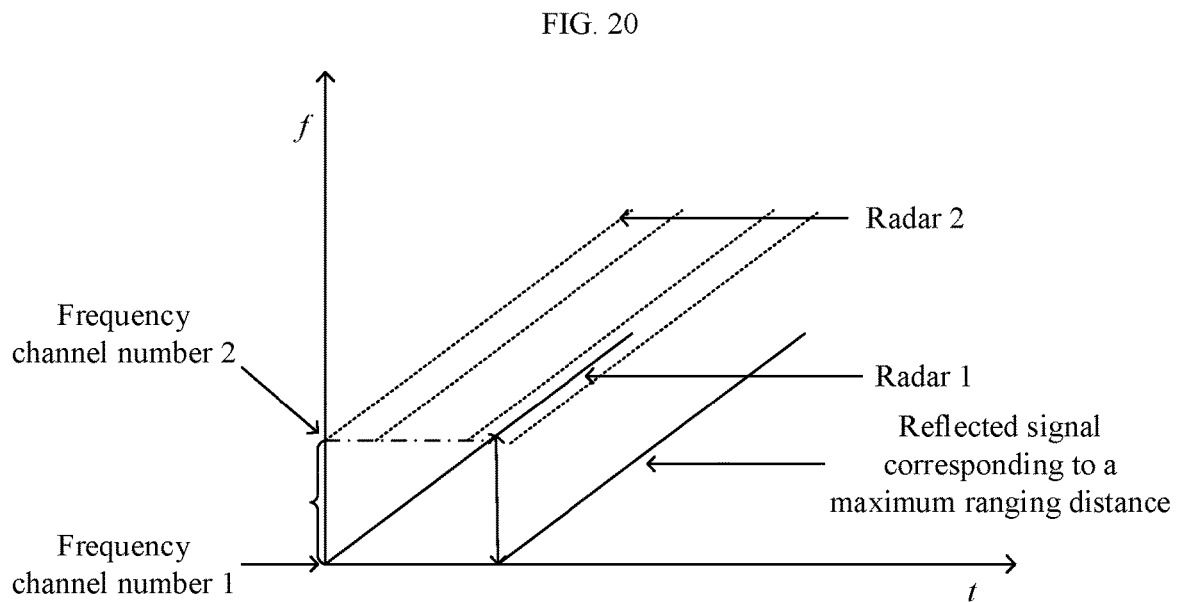
FIG. 21A is a fifth schematic diagram in which a transmit frequency/receive frequency of a radar signal changes with time according to an embodiment of this application.

FIG. 21A is a fifth schematic diagram in which a transmit frequency/receive frequency of a radar signal changes with time. If the error is not considered, a frequency change curve of a transmit signal of a radar 2 falls into an area between solid lines, and due to the error between the transmit moments, a reflected signal of the radar 2 causes interference to a radar 1. FIG. 21A provides an example for description based on the first optional design. A person skilled in the art may learn that the consideration of the error between the transmit moments may be applied to any one of the foregoing optional designs.

Based on the first optional design, in a sixth optional design, F1 is the frequency change range of the radio signal within the first time length T1, T1=T2+T3, and T3 is the transmission timing error.

Figure 21B:
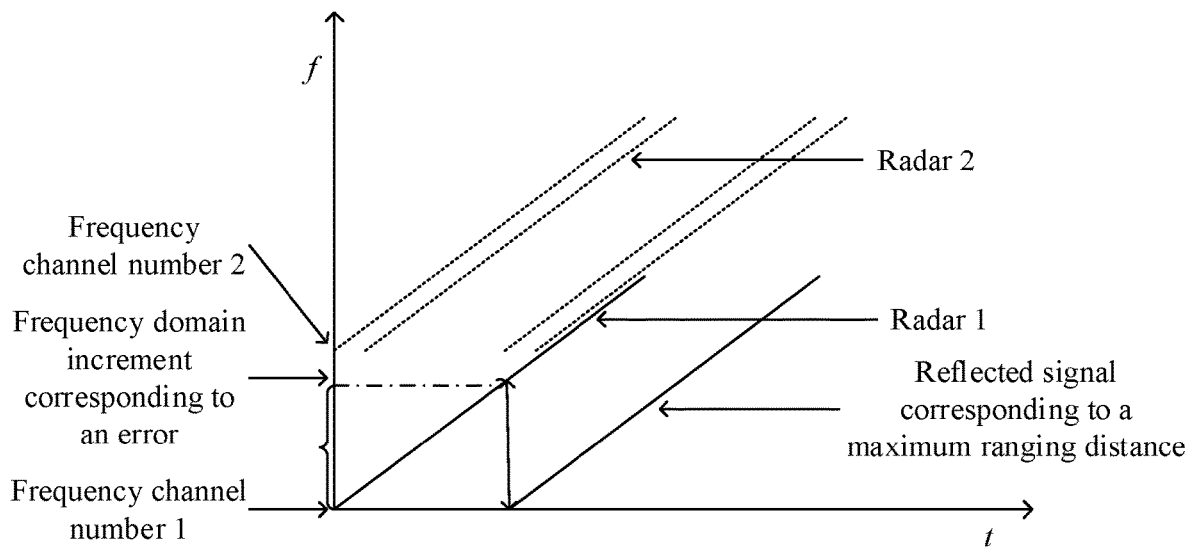
FIG. 21B is a sixth schematic diagram in which a transmit frequency/receive frequency of a radar signal changes with time according to an embodiment of this application.

FIG. 21B is a sixth schematic diagram in which a transmit frequency/receive frequency of a radar signal changes with time. A frequency domain change range within T3 is added to a frequency domain interval between adjacent frequency channel numbers, namely, a frequency channel number 1 and a frequency channel number 2, based on a frequency domain change range within T2. When the radar has a capability of distinguishing between a positive intermediate frequency and a negative intermediate frequency, a frequency change curve (a dashed line) of a reflected signal of a radar 2 just does not fall into a range between solid lines, and no interference is caused to the radar 1.

A person skilled in the art may learn that, the consideration of the error between the transmit moments in the foregoing sixth optional design may be applied to any one of the foregoing second to fifth optional designs. With reference to the descriptions in the sixth optional design, the following optional design further exists.

Based on the second optional design, in a seventh optional design, F1 is the frequency change range of the radio signal within the first time length T1, F1 is the frequency change range of the radio signal within the first time length T1, T1=M*T2+T3, and M is a positive number greater than 1, for example, M=2.

Based on the third optional design, in an eighth optional design, F1 is the frequency change range of the radio signal within the first time length T1, and T1=T2+T3+T4. For details, refer to FIG. 22.

Figure 22:
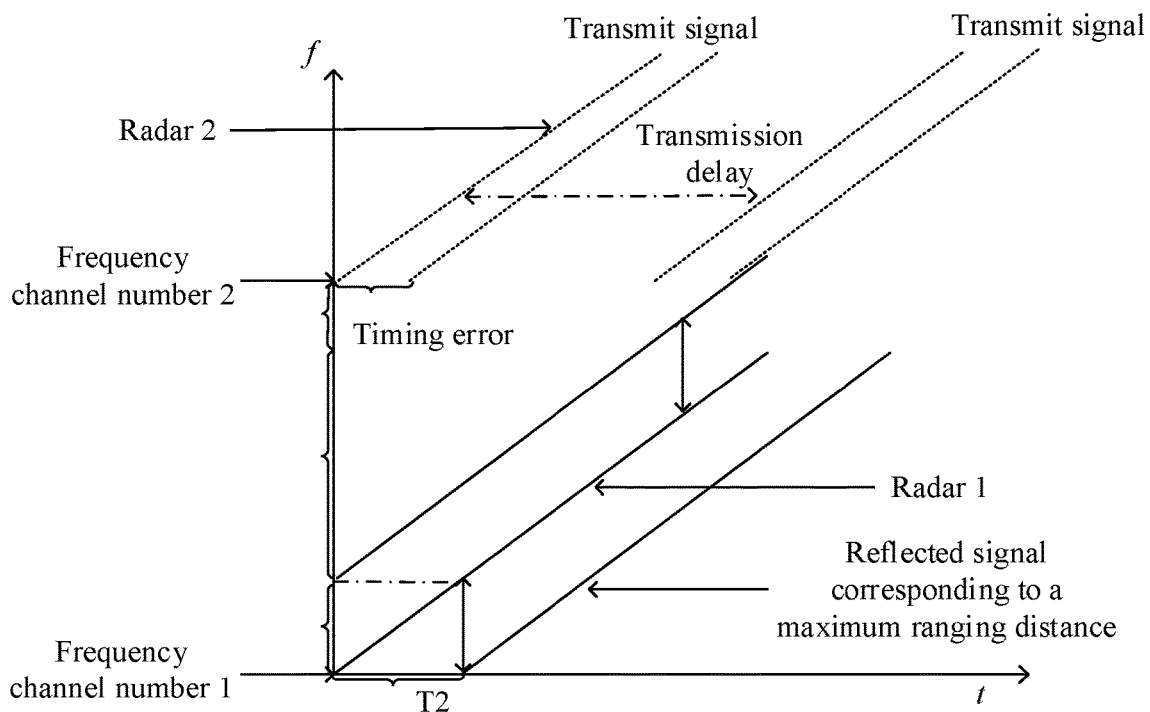
FIG. 22 is a seventh schematic diagram in which a transmit frequency/receive frequency of a radar signal changes with time according to an embodiment of this application.

FIG. 22 is a seventh schematic diagram in which a transmit frequency/receive frequency of a radar signal changes with time. It can be learned from FIG. 22 that frequency change ranges within a delay caused by the maximum ranging distance, a delay caused by the maximum interference tolerance distance, and a range of the transmission timing error are comprehensively considered for an absolute value of a frequency difference between adjacent frequency channel numbers, namely, a frequency channel number 1 and a frequency channel number 2. When a radar 2 transmits a signal on a frequency band corresponding to the frequency channel number 2, for a radar 1 that has a capability of distinguishing between a positive intermediate frequency and a negative intermediate frequency, a frequency change curve of either the transmit signal or a reflected signal of the radar 2 does not fall into an area between frequency change curves of a transmit signal and a reflected signal of the radar 1. For the radar 1 that cannot distinguish between the positive intermediate frequency and the negative intermediate frequency, the transmit signal of the radar 2 does not fall into an area (between two upper solid lines in FIG. 22) that causes the negative intermediate frequency. In addition, because the delay caused by the maximum interference tolerance distance is already considered, after the reflected signal of the radar 2 is attenuated due to reflection, interference that can be caused to the radar 1 may be ignored. Therefore, neither the transmit signal nor the reflected signal of the radar 2 causes interference to the radar.

For example, if an available bandwidth of the radar 1 is 1 GHz, a maximum ranging distance is 250 m, a sweeping time period (or a transmit cycle) is 14 μs, and a sweeping bandwidth is 200 MHz, a frequency change range (or an intermediate frequency $f_{IF}$) within the delay T2 caused by the maximum ranging distance is 23.8 MHz.

It is assumed that the transmission delay T4 brought by the maximum interference tolerance distance is 2 μs, and the transmission timing error T3 between radars is 0.5 μs. In this case, a value of F1 is $f_{IF}+\Delta F4+\Delta F3=59.5$ MHz.

Therefore, when the second threshold F' is equal to F1, an absolute value of a difference between lowest frequencies of any two frequency bands in the N' frequency bands is a positive integer multiple of 59.5, so that approximately N'=13 frequency bands are supported in a 1 GHz bandwidth.

Based on the fourth optional design, in a ninth optional design, F1 is the frequency change range of the radio signal within the first time length T1, and T1=M*T2+T3+T4.

Based on the fifth optional design, in a tenth optional design, F1 is the frequency change range of the radio signal within the first time length T1, and T1=max(T2,T4)+T3.

The foregoing embodiments describe radar signal processing in the frequency domain in the detection method, and the following describes some possible processing manners in the time domain.

The foregoing mainly describes the solutions provided in the embodiments of this application from a perspective of interaction between a detection apparatus such as a radar and a detection apparatus or a target object. It may be understood that to implement the foregoing functions, the apparatuses such as the detection apparatus and the target object include corresponding hardware structures and/or software modules for performing the functions. A person of ordinary skill in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, the detection apparatus may be divided into function modules. For example, each function module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely logical function division. In an actual implementation, another division manner may be used.

Figure 23:
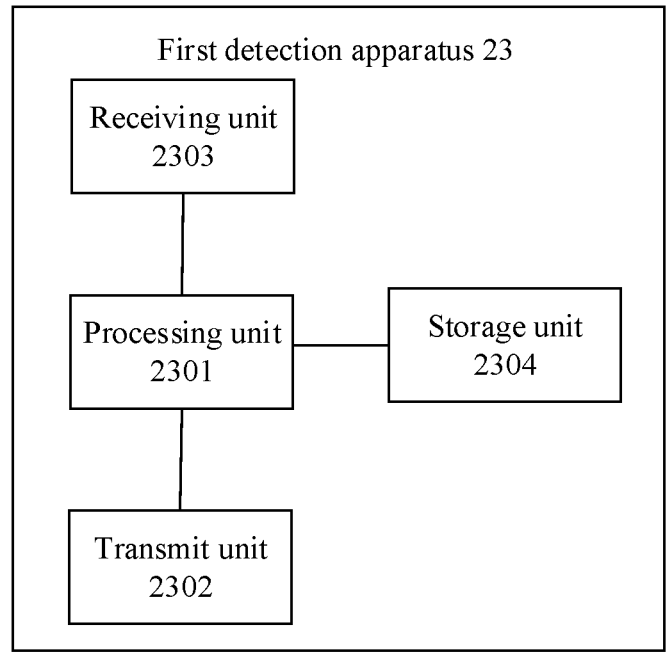
FIG. 23 is a possible schematic structural diagram of a first detection apparatus according to an embodiment of this application.

For example, when each function module of the detection apparatus is obtained through division in an integrated manner, FIG. 23 is a possible schematic structural diagram of a first detection apparatus related to the foregoing embodiments of this application. The first detection apparatus 23 may include a processing unit 2301, configured to determine a first frequency band, where the first frequency band is one of N frequency bands, a transmit unit 2302, configured to transmit a radio signal on the first frequency band, where any frequency band in the N frequency bands partially overlaps at least one frequency band in the other N−1 frequency bands, and a storage unit 2304, configured to store a program instruction and/or data.

Optionally, an absolute value of a difference between lowest frequencies of any two frequency bands in the N frequency bands is not less than a first threshold F, and N is a positive integer.

Optionally, an absolute value of a difference between a lowest frequency of any frequency band other than the first frequency band in the N frequency bands and a lowest frequency of the first frequency band is a positive integer multiple of the first threshold F.

Optionally, the N frequency bands include a second frequency band and a third frequency band, an absolute value of a difference between lowest frequencies of the second frequency band and the third frequency band is not less than a first threshold F, and a bandwidth of the second frequency band is different from a bandwidth of the third frequency band.

Optionally, the second frequency band is a frequency band in a second frequency band subset, the third frequency band is a frequency band in a third frequency band subset, a bandwidth of any frequency band in the second frequency band subset is a second bandwidth, a bandwidth of any frequency band in the third frequency band subset is a third bandwidth, the second bandwidth is different from the third bandwidth, and the second frequency band subset and the third frequency band subset are subsets of the N frequency bands.

Optionally, a value of the first threshold F is determined based on at least one of the following: when a second detection apparatus is an interfering source, a maximum interference tolerance distance of the first detection apparatus, a sweeping bandwidth of a radio signal of the first detection apparatus, a maximum ranging distance of the first detection apparatus, and a transmit cycle of the radio signal of the first detection apparatus, or when the first detection apparatus is an interfering source, a maximum interference tolerance distance of a second detection apparatus, a sweeping bandwidth of a radio signal of the second detection apparatus, a maximum ranging distance of the second detection apparatus, and a transmit cycle of the radio signal of the second detection apparatus.

Optionally, the value of the first threshold F meets the following formula: $F=\max(|\Delta f_1|,|\Delta f_2|,|\Delta fl_3|,|\Delta f_4|)+\sigma$, where $$\Delta f_1 = B_i - B_j + \frac{B_j\left(\frac{dif_{max}^{ji}}{c} + \Delta\tau\right)}{T_{cj}},$$

$$\Delta f_2 = \frac{B_j}{T_{cj}}\left(\frac{2d_{max}^i}{c} - \frac{dif_{max}^{ji}}{c} - \Delta\tau\right), \Delta f_3 = \frac{B_j}{T_{cj}}\left(\frac{dif_{max}^{ij}}{c} + \Delta\tau\right),$$

$$\text{and } \Delta f_4 = \frac{B_i}{T_{ci}}\left(T_{ci} - \frac{dif_{max}^{ij}}{c} - \Delta\tau\right) - \frac{B_j}{T_{cj}}\left(T_{cj} - \frac{2d_{max}^j}{c}\right),$$

where $B_i$ is the sweeping bandwidth of the radio signal of the first detection apparatus, $B_j$ is the sweeping bandwidth of the radio signal of the second detection apparatus, $B_i > B_j$, $dif_{max}^{ji}$ is the maximum interference tolerance distance of the first detection apparatus when the second detection apparatus is an interfering source, $\Delta\tau$ is a transmission timing error, $d_{max}^i$ is the maximum ranging distance of the first detection apparatus, $dif_{max}^{ij}$ is the maximum interference tolerance distance of the second detection apparatus when the first detection apparatus is an interfering source, $d_{max}^j$ is the maximum ranging distance of the second detection apparatus, c is the speed of light, $T_{ci}$ is the transmit cycle of the radio signal of the first detection apparatus, $T_{cj}$ is the transmit cycle of the radio signal of the second detection apparatus, and $\sigma$ is a predetermined constant or a preconfigured constant.

Optionally, the first frequency band is a frequency band in a first frequency band subset, and the first frequency band subset is a subset of the N frequency bands, an absolute value of a difference between lowest frequencies of any two frequency bands in the first frequency band subset is a positive integer multiple of a second threshold F', and the first frequency band subset corresponds to the first detection apparatus, and the first frequency band subset is one of the second frequency band subset and the third frequency band subset.

Optionally, the second threshold F' is greater than or equal to a frequency change range F1 of the radio signal within a first time length T1, and F' and F1 meet a formula $F'=F1+\sigma$, $\sigma$ is a predetermined constant or a preconfigured constant, and $\sigma \geq 0$.

Optionally, a value of the first time length T1 meets one of the following: $T1=2*d_{max}^i/c$, $T1=M*2*d_{max}^i/c$, $T1=2*d_{max}^i/c+dif_{max}^i/c$, $T1=\max(2*d_{max}^i/c, dif_{max}^i/c)$, $T1=2*d_{max}^i/c+\Delta\tau$, $T1=M*2*d_{max}^i/c+\Delta\tau$, $T1=2*d_{max}^i/c+\Delta\tau+dif_{max}^i/c$, and $T1=\max(2*d_{max}^i/c, dif_{max}^i/c)+\Delta\tau$, where $d_{max}^i$ is the maximum detection distance of the first detection apparatus, $\Delta\tau$ is the transmission timing error, $dif_{max}^i$ is the maximum interference tolerance distance of the first detection apparatus, c is the speed of light, and M is an integer greater than or equal to 2.

Optionally, a bandwidth of the first frequency band is a sweeping bandwidth of the radio signal.

Optionally, the detection apparatus further includes a receiving unit 2303, configured to receive a reflected signal of the transmit signal.

The optional design may be implemented independently, or may be implemented through integration with any one of the foregoing optional designs.

Figure 24:
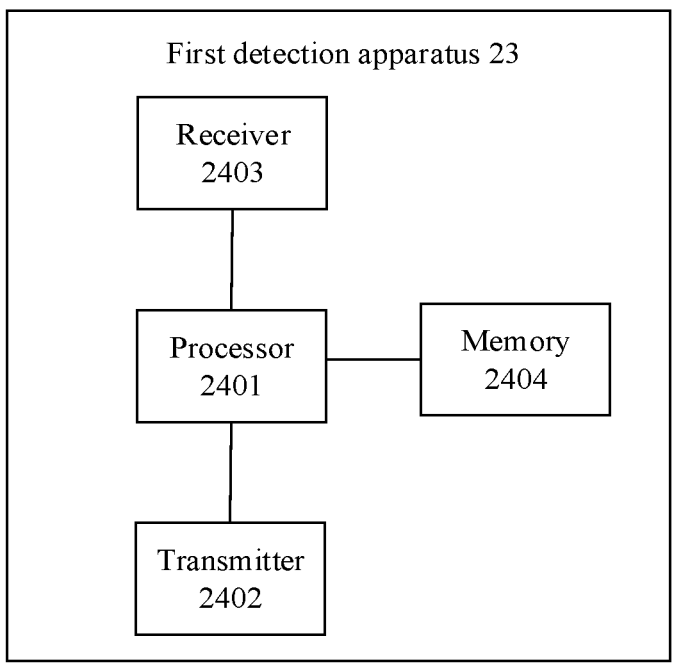
FIG. 24 is another possible schematic structural diagram of a first detection apparatus according to an embodiment of this application.

FIG. 24 is another possible schematic structural diagram of a first detection apparatus according to an embodiment of this application. The first detection apparatus 23 may include a processor 2401, a transmitter 2402, and a receiver 2403. Functions thereof may respectively correspond to specific functions of the processing unit 2301, the transmit unit 2302, and the receiving unit 2303 shown in FIG. 23. Details are not described herein again. Optionally, the detection apparatus may further include a memory 2404, configured to store a program instruction and/or data.

Figure 25:
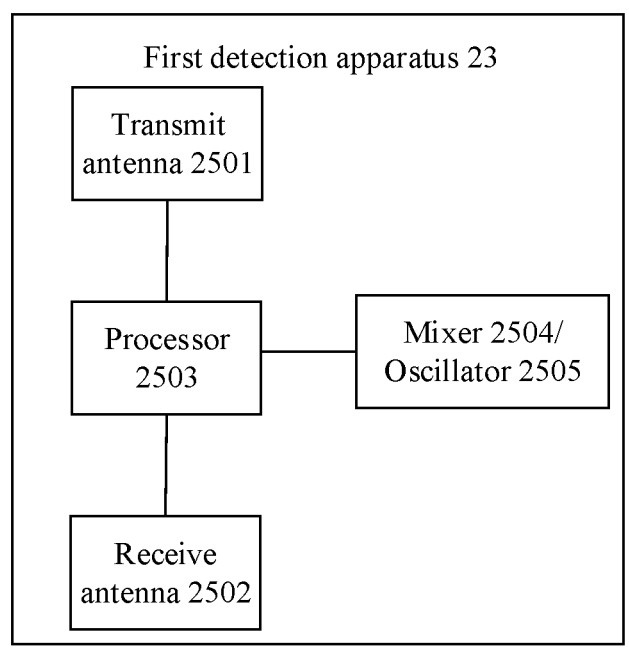
FIG. 25 is still another possible schematic structural diagram of a first detection apparatus according to an embodiment of this application.

FIG. 2 is a schematic structural diagram of a radar apparatus. Referring to the foregoing content, another optional manner is proposed. FIG. 25 is still another possible schematic structural diagram of a first detection apparatus. The detection apparatuses provided in FIG. 23 to FIG. 25 may be a part or all of a radar apparatus in an actual communication scenario, may be integrated into the radar apparatus or located outside the radar apparatus, provided that a corresponding function is implemented, and a structure and composition are not limited.

In this optional manner, the detection apparatus 23 includes a transmit antenna 2501, a receive antenna 2502, and a processor 2503. Further, the detection apparatus further includes a mixer 2504 and/or an oscillator 2505. Further, the detection apparatus may further include a low-pass filter, a directional coupler, and/or the like. The transmit antenna and the receive antenna are configured to support the detection apparatus in performing radio communication, the transmit antenna supports radio signal transmission, and the receive antenna supports radio signal receiving and/or reflected signal receiving, to finally implement a detection function. The processor performs some possible determining and/or processing functions. Further, the processor further controls operations of the transmit antenna and/or the receive antenna. Further, a signal that needs to be transmitted is transmitted by the processor by controlling the transmit antenna, and a signal received by using the receive antenna may be transmitted to the processor for corresponding processing. The parts included in the detection apparatus may be configured to execute any implementation solution in the method embodiments of this application. Optionally, the detection apparatus may further include a memory, configured to store a program instruction and/or data. The transmit antenna and the receive antenna may be independently disposed, or may be integrated and disposed as a transceiver antenna, to execute a corresponding transmit/receive function.

It should be noted that the second detection apparatus or any detection apparatus in the embodiments of this application may have a same structure as the first detection apparatus, that is, the second detection apparatus or any detection apparatus is also applicable to the schematic structural diagrams of FIG. 23 to FIG. 25.

In another optional manner, when software is used to implement the embodiments, some or all the embodiments may be implemented in a form of a computer program product. The computer program product includes one or more computer instructions. When the computer program instructions are loaded and executed on the computer, the procedure or functions according to the embodiments of this application are all or partially implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid state disk (SSD)), or the like.

It should be noted that the processor that is included in the detection apparatus and configured to perform the detection method provided in the embodiments of this application may be a central processing unit (CPU), a general-purpose processor, a digital signal processor (DSP), an application-specific integrated circuit (ASIC), a field-programmable gate array (FPGA) or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

Method or algorithm steps described in combination with the embodiments of this application may be implemented by hardware, or may be implemented by a processor by executing software instructions. The software instructions may be formed by a corresponding software module. The software module may be located in a random-access memory (RAM) memory, a flash memory, a read-only memory (ROM) memory, an erasable programmable ROM (EPROM) memory, an electrically EPROM (EEPROM) memory, a register, a hard disk, a removable magnetic disk, a compact disc (CD) ROM (CD-ROM), or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the detection apparatus. Certainly, the processor and the storage medium may exist in the receiving apparatus as discrete components.

It may be understood that FIG. 23 to FIG. 25 show only a simplified design of the detection apparatus. In actual application, the detection apparatus may include any quantities of transmitters, receivers, processors, controllers, memories, and other possible elements.

An embodiment of this application further provides a communications system, including at least one detection apparatus and at least one target object mentioned for executing the embodiments of this application.

An embodiment of this application further provides a communications system, including at least one detection apparatus and at least one central processing unit/central controller mentioned for executing the embodiments of this application. The central processing unit/central controller is configured to control driving of a vehicle and/or processing of another detection apparatus based on output of the at least one detection apparatus. The central processing unit/central controller may be located in the vehicle or another possible location, provided that the control is implemented.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement. In other words, an inner structure of an apparatus is divided into different function modules to implement all or some of the functions described above.

In the several embodiments provided in this application, it should be understood that the disclosed apparatus and method may be implemented in another manner. For example, the described apparatus embodiment is merely an example. For example, the module or unit division is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
   determining a first frequency band, wherein the first frequency band is one of N frequency bands, and wherein N is a positive integer; and
   transmitting a first radio signal on the first frequency band, wherein any frequency band in the N frequency bands partially overlaps at least one frequency band in other N−1 frequency bands of the N frequency bands, wherein a first bandwidth of the first frequency band is a first sweeping bandwidth of the first radio signal, wherein a first absolute value of a first difference between lowest frequencies of any two frequency bands in the N frequency bands is not less than a first threshold (F),
   wherein when a second detection apparatus is an interfering source, a value of the first threshold (F) is determined based on at least one of:
      a first maximum interference tolerance distance of a first detection apparatus, wherein a signal sent by the second detection apparatus at the first maximum interference tolerance distance to the first detection apparatus causes interference to the first detection apparatus;
      a second sweeping bandwidth of a second radio signal of the first detection apparatus, wherein the sweeping bandwidth is a bandwidth occupied by the second radio signal;
      a first maximum ranging distance of the first detection apparatus, wherein the first maximum ranging distance is a parameter related to a configuration of the first detection apparatus; or
      a first transmit cycle of the first radio signal, wherein the first transmit cycle is a time period of transmitting a complete waveform, and
   wherein when the first detection apparatus is a second interfering source, the value of the first threshold (F) is determined based on at least one of:
      a second maximum interference tolerance distance of the second detection apparatus;
      a third sweeping bandwidth of a third radio signal of the second detection apparatus;
      a second maximum ranging distance of the second detection apparatus; or
      a second transmit cycle of the third radio signal.

2. The method of claim 1, wherein a second absolute value of a second difference between a second lowest frequency of any frequency band other than the first frequency band in the N frequency bands and a third lowest frequency of the first frequency band is a positive integer multiple of F.

3. The method of claim 1, wherein the N frequency bands comprise a second frequency band comprising a first lowest frequency and a third frequency band comprising a second lowest frequency, wherein a second absolute value of a second difference between the first lowest frequency and the second lowest frequency is not less than the first threshold (F), and wherein a second bandwidth of the second frequency band is different from a third bandwidth of the third frequency band.

4. The method of claim 3, wherein the second frequency band is in a second frequency band subset, wherein the third frequency band is a frequency band in a third frequency band subset, wherein a bandwidth of any frequency band in the second frequency band subset is the second bandwidth, wherein a bandwidth of any frequency band in the third frequency band subset is the third bandwidth, the second bandwidth is different from the third bandwidth, and the second frequency band subset and the third frequency band subset are subsets of the N frequency bands.

5. The method of claim 1, wherein the value of the first threshold F meets the following formula:

$$F=\max(|\Delta f_1|,|\Delta f_2|,|\Delta f_3|,|\Delta f_4|)+\sigma,$$

wherein $\Delta f\_1 = B\_i - B\_j + (B\_j((\text{dif}\_\max \hat{ji})/c + \Delta\tau))/T\_cj$, wherein $\Delta f\_2 = B\_j/T\_cj\,((2d\_\max \hat{i})/c - (\text{dif}\_\max \hat{ji})/c - \Delta\tau)$, wherein $\Delta f\_3 = B\_j/T\_cj\,((\text{dif}\_\max \hat{ij})/c + \Delta\tau)$, wherein $\Delta f\_4 = B\_i/T\_ci\,(T\_ci - (\text{dif}\_\max \hat{ij})/c - \Delta\tau) - B\_j/T\_cj\,(T\_cj - (2d\_\max \hat{j})/c$, wherein $B_i$ is the second sweeping bandwidth of the second radio signal of the first detection apparatus, wherein $B_j$ is the third sweeping bandwidth of the third radio signal of the second detection apparatus, wherein $B_i > B_j$, wherein dif_ max ^ji is a first maximum interference tolerance distance of the first detection apparatus when the second detection apparatus is the interfering source, wherein $\Delta\tau$ is a transmission timing error, wherein d_ max ^i is the first maximum ranging distance of the first detection apparatus, wherein dif_ max ^ij is the second maximum interference tolerance distance of the second detection apparatus when the first detection apparatus is the interfering source, wherein d_ max ^j is the second maximum ranging distance of the second detection apparatus, wherein c is a speed of light, wherein $T_{ci}$ is the first transmit cycle of the second radio signal, wherein $T_{cj}$ is the second transmit cycle of the third radio signal, and wherein $\sigma$ is a predetermined constant or a preconfigured constant.

6. The method of claim 3, wherein the first frequency band is in a first frequency band subset of the N frequency bands, wherein a second absolute value of a second difference between third lowest frequencies of any two frequency bands in the first frequency band subset is a positive integer multiple of a second threshold (F'), wherein the first frequency band subset corresponds to the first detection apparatus, and wherein the first frequency band subset is one of a second frequency band subset or a third frequency band subset.

7. The method of claim 6, wherein the F' is greater than or equal to a frequency change range (F1) of the first radio signal within a first time length (T1), F' and F1 meet a formula: $F'=F1+\sigma$, $\sigma$ a predetermined constant or a preconfigured constant, and $\sigma \geq 0$.

8. The method of claim 7, wherein a value of the first time length T1 meets one of the following:

$$T1=2*d\_\max \hat{i}/c;$$

$$T1=M*2*d\_\max \hat{i}/c;$$

$$T1 = 2*d*\max{}^i ** \frac{}{c} \text{dif} \max{}^i + \frac{}{c};$$

$$T1=\max=2(d*\max\bot i\_/c(\text{dif, }\max\bot i\_/c));$$

$T1=2*d\_\max \hat{} i/c+\Delta\tau;$ $T1=M*2*d\_\max \hat{} i/c+\Delta\tau;$ $T1 = 2*d*\overset{i}{\max}**\frac{}{c}+\Delta\tau dif\overset{i}{\max}+\frac{}{c};$ or $T1=\max(2*d\_\max \hat{} i/c, dif\_\max \hat{} i/c)+\Delta\tau,$ wherein $d\_\max \hat{} i$ is a maximum detection distance of the first detection apparatus, wherein $\Delta\tau$ is is a transmission timing error, wherein $dif\_\max \hat{} i$ is the first maximum interference tolerance distance of the first detection apparatus, wherein c is a speed of light, and wherein M is an integer integer greater than 2.

9. A first detection apparatus comprising:
a memory configured to store program instructions; and
one or more processors coupled to the memory, wherein the program instructions, when executed by the one or more processors, cause the first detection apparatus to:
determine a first frequency band, wherein the first frequency band is one of N frequency bands, and wherein N is a positive integer; and
transmit a first radio signal on the first frequency band, wherein any frequency band in the N frequency bands partially overlaps at least one frequency band in other N−1 frequency bands of the N frequency bands, wherein a first bandwidth of the first frequency band is a first sweeping bandwidth of the first radio signal, wherein a first absolute value of a first difference between lowest frequencies of any two frequency bands in the N frequency bands is not less than a first threshold (F),
wherein when a second detection apparatus is an interfering source, a value of the first threshold (F) is determined based on at least one of:
a first maximum interference tolerance distance of a first detection apparatus, wherein a signal sent by the second detection apparatus at the first maximum interference tolerance distance to the first detection apparatus causes interference to the first detection apparatus;
a second sweeping bandwidth of a second radio signal of the first detection apparatus, wherein the sweeping bandwidth is a bandwidth occupied by the second radio signal;
a first maximum ranging distance of the first detection apparatus, wherein the first maximum ranging distance is a parameter related to a configuration of the first detection apparatus; or
a first transmit cycle of the first radio signal, wherein the first transmit cycle is a time period of transmitting a complete waveform, and
wherein when the first detection apparatus is a second interfering source, the value of the first threshold (F) is determined based on at least one of:
a second maximum interference tolerance distance of the second detection apparatus;
a third sweeping bandwidth of a third radio signal of the second detection apparatus;
a second maximum ranging distance of the second detection apparatus; or
a second transmit cycle of the third radio signal.

10. The first detection apparatus of claim 9, wherein a second absolute value of a second difference between a second lowest frequency of any frequency band other than the first frequency band in the N frequency bands and a third lowest frequency of the first frequency band is a positive integer multiple of F.

11. The first detection apparatus of claim 9, wherein the N frequency bands comprise a second frequency band comprising a first lowest frequency and a third frequency band comprising a second lowest frequency, wherein a second absolute value of a second difference between the first lowest frequency and the second lowest frequency is not less than the first threshold (F), and wherein a second bandwidth of the second frequency band is different from a third bandwidth of the third frequency band.

12. The first detection apparatus of claim 11, wherein the second frequency band is a frequency band in a second frequency band subset, the third frequency band is a frequency band in a third frequency band subset, a bandwidth of any frequency band in the second frequency band subset is the second bandwidth, a bandwidth of any frequency band in the third frequency band subset is the third bandwidth, the second bandwidth is different from the third bandwidth, and the second frequency band subset and the third frequency band subset are subsets of the N frequency bands.

13. The first detection apparatus of claim 9, wherein the value of the first threshold F meets the following formula:

$F=\max(|\Delta f_1|,|\Delta f_2|,|\Delta f_3|,|\Delta f_4|)+\sigma,$ wherein $\Delta f\_1=B\_i-B\_j+(B\_j((dif\_\max \hat{} ji)/c+\Delta\tau))/T\_cj$, wherein $\Delta f\_2=B\_j/T\_cj \ ((2d\_\max i)/c-(dif\_\max \hat{} ji)/c-\Delta\tau)$, wherein $\Delta f\_3=B\_j/T \ cj((dif\_\max \hat{} ij)/c+\Delta\tau)$, wherein $\Delta f\_4=B\_i/T\_ci \ (T\_ci-(dif\_\max \hat{} ij)/c-\Delta\tau)-B\_j/T\_cj \ (T\_cj-(2d\_\max \hat{} j)/c)$, wherein $B_i$ is the second sweeping bandwidth of the second radio signal of the first detection apparatus, wherein $B_j$ is the third sweeping bandwidth of the third radio signal of the second detection apparatus, wherein $B_i>B_j$, wherein $dif\_\max \hat{} ji$ is the first maximum interference tolerance distance of the first detection apparatus when the second detection apparatus is the first interfering source, wherein $\Delta\tau$ is a transmission timing error, wherein $d\_\max \hat{} i$ is a first maximum ranging distance of the first detection apparatus, wherein $dif\_\max \hat{} ij$ is the second maximum interference tolerance distance of the second detection apparatus when the first detection apparatus is the second interfering source, wherein $d\_\max \hat{} j$ is a second maximum ranging distance of the second detection apparatus, wherein c is a speed of light, wherein $T_{ci}$ is the first transmit cycle of the second radio signal, wherein $T_{cj}$ is the second transmit cycle of the third radio signal, and wherein σ is a predetermined constant or a preconfigured constant.

14. The first detection apparatus of claim 11, wherein the first frequency band is in a first frequency band subset of the N frequency bands, wherein a second absolute value of a second difference between third lowest frequencies of any two frequency bands in the first frequency band subset is a positive integer multiple of a second threshold (F'), wherein the first frequency band subset corresponds to the first detection apparatus, and wherein the first frequency band subset is one of a second frequency band subset or a third frequency band subset.

15. A computer program product comprising computer-executable instructions stored on a non-transitory computer-readable storage medium, that when executed by one or more processors, cause a first detection apparatus to:
determine a first frequency band, wherein the first frequency band is one of N frequency bands, and wherein N is a positive integer; and
transmit a first radio signal on the first frequency band, wherein any frequency band in the N frequency bands partially overlaps at least one frequency band in other N−1 frequency bands of the N frequency bands, wherein a first bandwidth of the first frequency band is a first sweeping bandwidth of the first radio signal, wherein a first absolute value of a first difference between lowest frequencies of any two frequency bands in the N frequency bands is not less than a first threshold (F), wherein when a second detection apparatus is an interfering source, a value of the first threshold (F) is determined based on at least one of:
- a first maximum interference tolerance distance of a first detection apparatus, wherein a signal sent by the second detection apparatus at the first maximum interference tolerance distance to the first detection apparatus causes interference to the first detection apparatus;
- a second sweeping bandwidth of a second radio signal of the first detection apparatus, wherein the sweeping bandwidth is a bandwidth occupied by the second radio signal;
- a first maximum ranging distance of the first detection apparatus, wherein the first maximum ranging distance is a parameter related to a configuration of the first detection apparatus; or
- a first transmit cycle of the first radio signal, wherein the first transmit cycle is a time period of transmitting a complete waveform, and wherein when the first detection apparatus is a second interfering source, the value of the first threshold (F) is determined based on at least one of:
- a second maximum interference tolerance distance of the second detection apparatus;
- a third sweeping bandwidth of a third radio signal of the second detection apparatus;
- a second maximum ranging distance of the second detection apparatus; or
- a second transmit cycle of the third radio signal.

16. The method of claim 1, wherein a second radio signal from the second detection apparatus at the first maximum interference tolerance distance causes interference to the first detection apparatus, wherein the second sweeping bandwidth is a bandwidth occupied by the second radio signal, wherein the first maximum ranging distance is a parameter related to a configuration of the first detection apparatus, and wherein the first transmit cycle of the first radio signal is a time period of transmitting a complete waveform.

17. The first detection apparatus of claim 9, wherein a second radio signal from the second detection apparatus at the first maximum interference tolerance distance causes interference to the first detection apparatus, wherein the second sweeping bandwidth is a bandwidth occupied by the second radio signal, wherein the first maximum ranging distance is a parameter related to a configuration of the first detection apparatus, and wherein the first transmit cycle of the first radio signal is a time period of transmitting a complete waveform.

18. The computer program product of claim 15, wherein a second radio signal from the second detection apparatus at the first maximum interference tolerance distance causes interference to the first detection apparatus, wherein the second sweeping bandwidth is a bandwidth occupied by the second radio signal, wherein the first maximum ranging distance is a parameter related to a configuration of the first detection apparatus, and wherein the first transmit cycle of the first radio signal is a time period of transmitting a complete waveform.

19. The computer program product of claim 15, wherein a second absolute value of a second difference between a second lowest frequency of any frequency band other than the first frequency band in the N frequency bands and a third lowest frequency of the first frequency band is a positive integer multiple of F.

20. The computer program product of claim 15, wherein the N frequency bands comprise a second frequency band comprising a first lowest frequency and a third frequency band comprising a second lowest frequency, wherein a second absolute value of a second difference between the first lowest frequency and the second lowest frequency is not less than the first threshold (F), and wherein a second bandwidth of the second frequency band is different from a third bandwidth of the third frequency band.

* * * * *

UNITED STATES PATENT AND TRADEMARK OFFICE
CERTIFICATE OF CORRECTION

PATENT NO. : 11,971,468 B2  
APPLICATION NO. : 17/390286  
DATED : April 30, 2024  
INVENTOR(S) : Song et al.

Page 1 of 1

It is certified that error appears in the above-identified patent and that said Letters Patent is hereby corrected as shown below:

In the Claims

Claim 5, Column 38, Line 23: "j)/c, wherein" should read "j)/c), wherein"

Claim 9, Column 39, Line 12: "is is a transmission" should read "is a transmission"

Signed and Sealed this
Fourth Day of June, 2024

Katherine Kelly Vidal
*Director of the United States Patent and Trademark Office*